United States Patent
Tanaka

(10) Patent No.: US 7,466,565 B2
(45) Date of Patent: Dec. 16, 2008

(54) SWITCHING POWER SUPPLY UNIT AND VOLTAGE DETECTION CIRCUIT

(75) Inventor: Katsuaki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/646,273

(22) Filed: Dec. 28, 2006

(65) Prior Publication Data
US 2007/0133239 A1 Jun. 14, 2007

(30) Foreign Application Priority Data
Sep. 27, 2006 (JP) .............................. 2006-262457

(51) Int. Cl.
*H02M 3/335* (2006.01)
*G05F 1/00* (2006.01)
(52) U.S. Cl. ............................ 363/16; 363/17; 323/272
(58) Field of Classification Search .............. 363/21.08, 363/56.01, 56.02, 56.05, 56.07, 56.08, 16, 363/17; 323/271, 272
See application file for complete search history.

(56) References Cited

U.S. PATENT DOCUMENTS

| | | | |
|---|---|---|---|
| 4,280,174 A | 7/1981 | Sonda | |
| 5,278,748 A | 1/1994 | Kitajima | |
| 5,387,822 A | 2/1995 | Martin-Lopez et al. | |
| 5,459,650 A * | 10/1995 | Noro | 363/24 |
| 5,963,438 A | 10/1999 | Chen | |
| 6,088,244 A * | 7/2000 | Shioya et al. | 363/21.07 |
| 6,532,160 B2 * | 3/2003 | Hirokawa et al. | 363/52 |
| 7,019,991 B2 * | 3/2006 | Yamashita | 363/52 |
| 2002/0154519 A1 * | 10/2002 | Nakahara et al. | 363/20 |

FOREIGN PATENT DOCUMENTS

| | | |
|---|---|---|
| JP | A-5-199746 | 8/1993 |
| JP | A-9-312973 | 12/1997 |
| JP | A-11-285245 | 10/1999 |
| JP | A 2003-18840 | 1/2003 |
| JP | A 2003-33015 | 1/2003 |
| JP | A 2003-259637 | 9/2003 |
| JP | A 2004-198251 | 7/2004 |

* cited by examiner

*Primary Examiner*—Jessica Han
*Assistant Examiner*—Emily Pham
(74) *Attorney, Agent, or Firm*—Oliff & Berridge, PLC

(57) ABSTRACT

A switching power supply unit is provided, in which a DC input voltage can be detected even if switching operation of the power supply unit is stopped. A switching power supply unit includes: a power supply main section switching a DC input voltage inputted from a first power supply to convert the DC input voltage into an AC voltage, and outputting a DC output voltage into a second power supply, the DC output voltage being obtained by transforming and rectifying the AC voltage; and a voltage detection section having a voltage detection transformer, one or more switching elements, and detection signal lines. The voltage detection transformer includes a first transformer coil as a primary winding being intermittently applied with the DC input voltage in response to on/off of the switching element, and a second transformer coil as a secondary winding being connected to the detection signal lines.

10 Claims, 22 Drawing Sheets

SWITCHING POWER SUPPLY UNIT AND VOLTAGE DETECTION CIRCUIT

BACKGROUND OF THE INVENTION

1. Field of the Invention

The present invention relates to a switching power supply unit being configured to produce switching output obtained by switching DC input voltage at an output winding of a voltage conversion transformer, and a voltage detection circuit for use in such a switching power supply unit.

2. Description of the Related Art

Generally, a hybrid electric vehicle is equipped with a low voltage battery of outputting a low DC voltage such as about 12 V as a power supply for driving in-vehicle instruments such as a wiper, a headlight, a room light, an audio instrument, an air conditioner, and various measuring instruments, and equipped with a high voltage battery of outputting a high DC voltage such as about 400 V as a power supply for driving a motor. Typically, such a low voltage battery is charged by rectifying an AC output voltage from an AC generator driven by using rotation of an engine to obtain a high DC voltage, and converting such a DC input voltage into a relatively low DC voltage by using a switching power supply unit, and then supplying the low DC voltage to the low voltage battery. The high voltage battery is charged by the DC input voltage supplied from an engine side. For example, as described in Japanese Unexamined Patent Publication No. 2003-259637, the switching power supply unit performs voltage conversion by temporarily converting a DC input voltage into an AC voltage using an inverter circuit, then transforming the AC voltage by using a voltage conversion transformer and converting into a DC voltage again by using a rectifier circuit or the like.

When the DC input voltage supplied from the engine side exceeds a withstanding voltage of an internal circuit of the switching power supply unit, the internal circuit may be broken. Therefore, it is important to monitor the DC input voltage at any time to prevent the internal circuit from being broken. This is applicable not only to the switching power supply unit installed in the hybrid electric vehicle, but also to a typical switching power supply unit.

For example, in Japanese Unexamined Patent Publication No. 2003-33015, a voltage detection circuit for detecting a DC input voltage is provided. The voltage detection circuit detects a voltage induced in an output winding of a voltage conversion transformer, then estimates the DC input voltage by calculation.

SUMMARY OF THE INVENTION

However, in a technique of Japanese Unexamined Patent Publication No. 2003-33015, once switching operation of the switching power supply unit is stopped, and voltage is not induced in the output winding, it is difficult to detect the DC input voltage. In this way, the technique of Japanese Unexamined Patent Publication No. 2003-33015 has a difficulty that the DC input voltage is extremely hard to be detected at any time.

In view of foregoing, first, it is desirable to provide a switching power supply unit being able to detect a DC input voltage even if switching operation of the power supply unit is stopped.

Second, it is desirable to provide a voltage detection circuit preferably usable for the switching power supply unit.

A first switching power supply unit of an embodiment of the invention includes a power supply main section switching a DC input voltage inputted from a first power supply to convert the DC input voltage into an AC voltage, and outputting a DC output voltage into a second power supply, the DC output voltage being obtained by transforming and rectifying the AC voltage, and a voltage detection section having a voltage detection transformer, one or more switching elements, and detection signal lines. The voltage detection transformer includes a first transformer coil as a primary winding being intermittently applied with the DC input voltage in response to on/off of the switching element, and a second transformer coil as a secondary winding being connected to the detection signal lines.

In the first switching power supply unit of an embodiment of the invention, in the voltage detection section, when the switching element is switched to be on, the DC input voltage from the first power supply is converted into a pulse-like voltage, and current flows through the first transformer coil. Then, the current in the first transformer coil induces a pulse-like voltage in the second transformer coil. Here, since the current flowing through the first transformer coil contains information of the DC input voltage from the first power supply, the voltage induced in the second transformer coil also contains the information of the DC input voltage from the first power supply. In this way, the voltage containing the information of the DC input voltage from the first power supply is detected by the voltage detection section.

The first switching power supply unit of an embodiment of the invention can be configured to allow the voltage detection section to have a single switching element, and allow the first transformer coil and the switching element to be connected in series with each other between a couple of output terminals of the first power supply, that is, can be in a so-called forward configuration. In this case, the voltage detection section preferably has an emission circuit which emits energy stored in the voltage detection transformer. In the case of such a configuration, since the stored energy is emitted by the emission circuit and thermally consumed, thereby a core of the voltage detection transformer is reset, for example, even if the DC input voltage falls to 0 V, a voltage containing the information of the DC input voltage can be detected.

Moreover, the switching power supply unit can be configured to allow the voltage detection section to have two switching elements each disposed in each of both ends of the first transformer coil, and allow the first transformer coil and the two switching elements to be connected in series with each other between a couple of output terminals of the first power supply, that is, can be in a so-called double-forward configuration. In this case, the voltage detection section preferably has a regeneration circuit which regenerates energy stored in the voltage detection transformer for the first power supply. In the case of such a configuration, since a core of the voltage detection transformer is reset by the regeneration circuit, for example, even if the DC input voltage falls to 0 V, the DC input voltage can be detected. Moreover, since the stored energy is regenerated for the first power supply, power loss is reduced compared with the case having the emission circuit.

The first switching power supply unit of an embodiment of the invention may have a holding section holding output voltage on the detection signal lines when the switching element is on, and a comparison section outputting a control signal for stopping switching operation of the power supply main section when an absolute value of the voltage held by the holding section is larger than an absolute value of a reference voltage. In the case of such a configuration, the switching operation of the power supply main section can be stopped based on the voltage containing the information of the DC input voltage detected by the voltage detection section.

In the first switching power supply unit of an embodiment of the invention, the first transformer coil may be magnetically coupled with the second transformer coil such that polarity of the first transformer coil is the same as polarity of the second transformer coil. Moreover, the switching element is preferably driven by using power supplied from the second power supply. In the case of such a configuration, since power is supplied from the second power supply being a stable power supply, operation of the voltage detection section is stabilized.

A first voltage detection circuit of an embodiment of the invention is a circuit of detecting a DC voltage, and includes a voltage detection transformer, one or more switching elements, and detection signal lines, wherein the voltage detection transformer includes a first transformer coil as a primary winding coil being intermittently applied with the DC voltage in response to on/off of the switching element, and a second transformer coil as a secondary winding being connected to the detection signal lines.

In the first voltage detection circuit of an embodiment of the invention, when the switching element is switched, a DC voltage as a detection object is converted into a pulse-like voltage, and current flows through the first transformer coil. Then, the current in the first transformer coil induces a pulse-like voltage in the second transformer coil. Here, since the current flowing through the first transformer coil contains information of the DC voltage, the voltage induced in the second transformer coil also contains the information of the DC voltage. In this way, the voltage containing the information of the DC voltage as the detection object is detected.

A second switching power supply unit of an embodiment of the invention includes: a power supply main section switching a DC input voltage inputted from a first power supply to convert the DC input voltage into an AC voltage, and outputting a DC output voltage into a second power supply, the DC output voltage being obtained by transforming and rectifying the AC voltage; a voltage detection section having a voltage detection transformer, a switching element, and detection signal lines, wherein the voltage detection transformer includes a first transformer coil as a primary winding being connected to the first power supply, a second transformer coil as a secondary winding being connected to the detection signal lines, and a third transformer coil magnetically coupled with the first transformer coil and intermittently applied with a DC voltage in response to on/off of the switching element.

In the second voltage detection circuit of an embodiment of the invention, when the switching element is switched, a DC voltage is converted into a pulse-like voltage, and current flows through the third transformer coil, in the voltage detection section. Then, power is transmitted to the first transformer coil, and a pulse-like current is induced therein, then the current in the first transformer coil induces a pulse-like voltage in the second transformer coil. Here, since the current flowing through the first transformer coil contains information of a DC input voltage from the first power supply, the voltage induced in the second transformer coil also contains the information of the DC input voltage from the first power supply. In this way, the voltage containing the information of the DC input voltage from the first power supply is detected by the voltage detection section.

Moreover, in the second switching power supply unit of an embodiment of the invention, preferably, the first transformer coil, second transformer coil, and third transformer coil are magnetically coupled with one another such that polarity of the first and second transformer coils is opposite to polarity of the third transformer coil, and a first rectifier element flowing current through the first transformer coil only when the switching element is off, and a second rectifier element flowing current through the second transformer coil only when the switching element is off are preferably provided in the voltage detection section, respectively.

In this case, when the switching element is on, current flows through the third transformer coil, on the other hand, current does not flow through the first and second transformer coils, therefore energy is stored in the voltage detection transformer. Then, when the switching element is off, the stored energy is released to the first transformer coil, consequently current flows through the first transformer coil. In this way, since current flows in an opposite phase between the first and third transformer coils, a voltage independent of a level of the DC voltage from the second power supply is induced in the second transformer coil.

Moreover, in the second switching power supply unit of an embodiment of the invention, when the power supply main section is set to allow a DC output voltage of a rectifier circuit to be lower than the DC input voltage of the first power supply, that is, when the power supply main section is in a step-down type, the third transformer coil is preferably supplied with energy from the second power supply. Moreover, when the power supply main section is set to allow the DC output voltage of the rectifier circuit to be higher than the DC input voltage of the first power supply, that is, when the power supply main section is in a step-up type, the third transformer coil is preferably supplied with energy from the first power supply. That is, the third transformer coil is preferably provided on a low-voltage side. By configuring in this way, the power supply main section need not be configured by high withstanding voltage components.

A second voltage detection circuit of an embodiment of the invention is a circuit of detecting a DC voltage, and includes a voltage detection transformer, a switching element, and detection signal lines, wherein the voltage detection transformer includes a first transformer coil as a primary winding being connected to a supply side of the DC voltage, a second transformer coil as a secondary winding being connected to the detection signal lines, and a third transformer coil magnetically coupled with the first transformer coil, and intermittently applied with a DC voltage in response to on/off of the switching element.

In the second voltage detection circuit of an embodiment of the invention, when the switching element is switched, a DC voltage is converted into a pulse-like voltage, and current flows through the third transformer coil. Then, power is transmitted to the first transformer coil, and a pulse-like current is induced therein, then the current in the first transformer coil induces a pulse-like voltage in the second transformer coil. Here, since the current flowing through the first transformer coil contains information of a DC voltage as a detection object, the voltage induced in the second transformer coil also contains the information of the DC voltage. In this way, the voltage containing the information of the DC voltage as the detection object is detected.

According to the first switching power supply unit of an embodiment of the invention, the DC input voltage is applied from the first power supply to the first transformer coil, and the voltage containing the information of the DC input voltage from the first power supply is detected from an output end of the first power supply rather than from an output end of the second power supply, therefore even after the switching operation of the power supply main section has been stopped, the DC input voltage can be detected.

According to the first voltage detection circuit of an embodiment of the invention, since the first transformer coil is applied with the DC voltage as the detection object and the voltage containing the information of the DC voltage is detected, even if the DC voltage as the detection object falls to 0 V, the DC voltage can be detected. Accordingly, when the voltage detection circuit is used for, for example, a switching power supply unit, even after the switching operation of the power supply unit has been stopped, the DC input voltage can be detected, and consequently the circuit can be preferably used for the switching power supply unit and the like.

According to the second switching power supply unit of an embodiment of the invention, the DC input voltage is applied to the third transformer coil, and the voltage containing the information of the DC voltage from the first power supply is detected from an output end of the first power supply rather than from an output end of the second power supply, therefore even after the switching operation of the power supply main section has been stopped, the DC input voltage can be detected. Therefore, the DC input voltage can be detected at any time.

In particular, when the first transformer coil, second transformer coil, and third transformer coil are magnetically coupled with one another such that polarity of the first and second transformer coils is opposite to polarity of the third transformer coil, and the first rectifier element and the second rectifier element are provided in the voltage detection section respectively, the voltage independent of a level of the DC voltage from the second power supply (or a DC output voltage from a rectifier circuit) can be induced in the second transformer coil. Thus, since influence of variation of the DC voltage from the second power supply, or influence of variation of a DC output voltage due to a surge voltage induced in a secondary side of a voltage conversion transformer is avoided, the DC input voltage can be further accurately detected.

Moreover, in the case that when the power supply main section is in the step-down type, the third transformer coil is supplied with energy from the second power supply, and when it is in the step-up type, the third transformer coil is supplied with energy from the first power supply, a withstanding voltage of the voltage detection section can be reduced. Thus, the voltage detection section can be inexpensively manufactured.

According to the second voltage detection circuit of an embodiment of the invention, since the DC voltage is applied to the third transformer coil, and the voltage containing the information of the DC voltage as the detection object is detected, when the voltage detection circuit is used for, for example, a switching power supply unit, even after the switching operation of the power supply unit has been stopped, the DC input voltage can be detected, consequently the circuit can be preferably used for the switching power supply unit and the like.

Other and further objects, features and advantages of the invention will appear more fully from the following description.

DETAILED DESCRIPTION OF THE PREFERRED EMBODIMENTS

Hereinafter, the best mode for carrying out an embodiment of the invention (hereinafter, simply referred to embodiment) will be described in detail with reference to drawings.

First Embodiment

Figure 1:
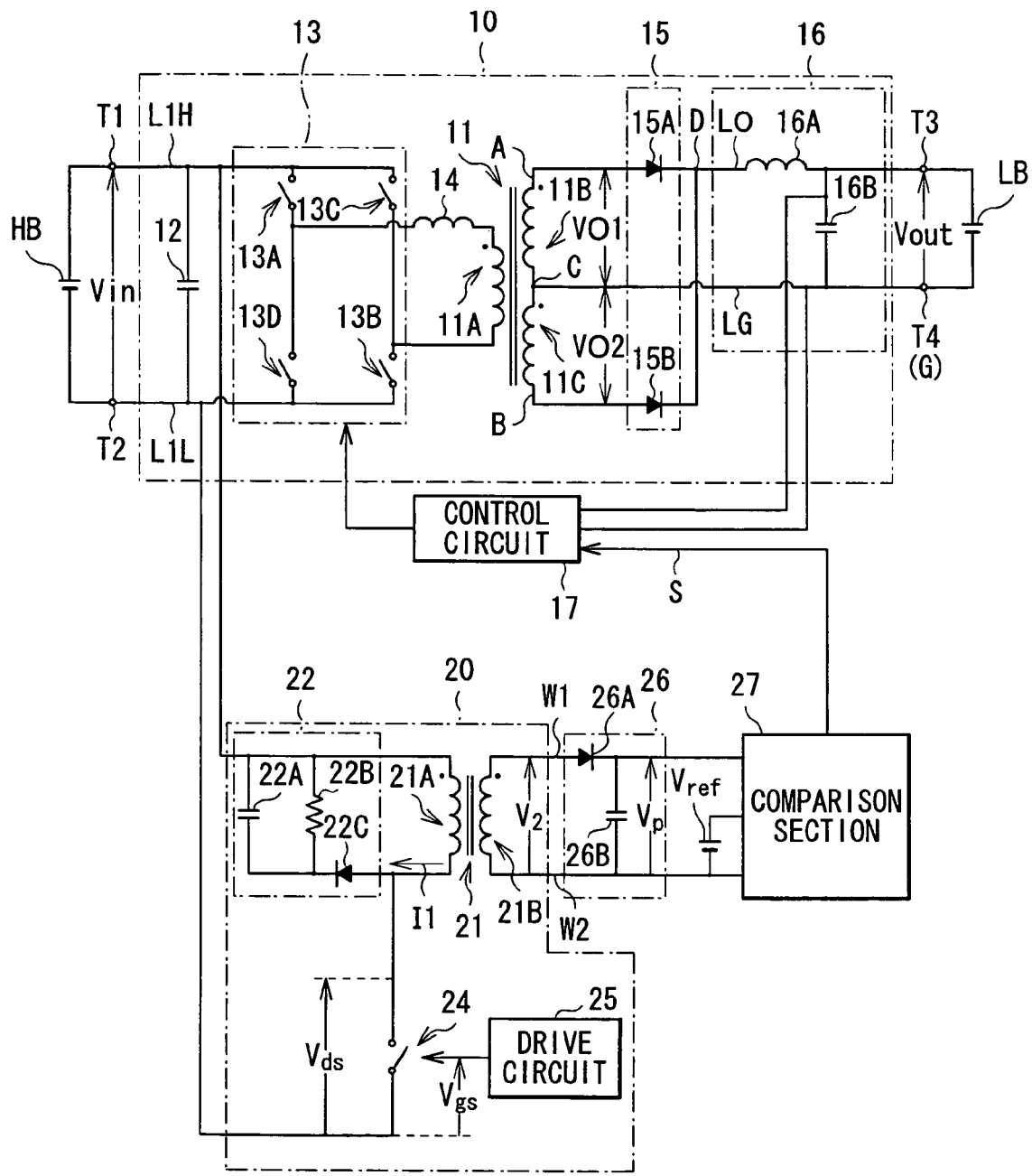
FIG. 1 shows a circuit diagram showing a configuration of a switching power supply unit according to a first embodiment of the invention.

FIG. 1 shows a configuration of a switching power supply unit according to a first embodiment of the invention. The switching power supply unit functions as a DC-DC converter of converting a high DC input voltage Vain supplied from a high-voltage battery HB (first power supply) into a relatively low DC output voltage Vout, and supplying the voltage Vout to a low-voltage battery LB. (second power supply), and is a switching power supply unit of which the secondary side is in center-tap cathode common connection as will be described later.

The switching power supply unit includes a power supply main section 10, a voltage detection section 20 (voltage detection circuit) being connected in parallel with the power supply main section 10, a holding section 26 being connected to the voltage detection section 20, a comparison section 27 being connected to the holding section 26, and a control circuit 17 being connected to the power supply main section 10.

First, a configuration of the power supply main section 10 is described.

The power supply main section 10 has a transformer 11 in a 3-winding type including a primary winding 11A and secondary windings 11B and 11C. A smoothing capacitor 12, an inverter circuit 13 and a resonance inductor 14 are provided in a primary side of the transformer 11, and a rectifier circuit 15 and a smoothing circuit 16 are provided in a secondary side thereof, respectively. The smoothing capacitor 12 and the inverter circuit 13 are provided between a primary high-voltage line L1H and a primary low-voltage line L1L, and the resonance inductor 14 is provided between the inverter circuit 13 and the primary winding 11A, respectively.

Moreover, the primary high-voltage line L1H has an input terminal T1, and a primary low-voltage line L1L has an input terminal T2 respectively, and the input terminals T1 and T2 are connected to output terminals of the high-voltage battery HB. Moreover, an output line LO being a line at a high-voltage side of the smoothing circuit 16 has an output terminal T3, and a ground line LG being a line at a low-voltage side of the smoothing circuit 16 has an output terminal T4 respectively, and the output terminals T3 and T4 are connected to input/output terminals of the low-voltage battery LB.

The inverter circuit 13 is a single-phase inverter circuit of converting a DC input voltage Vain outputted from the high-voltage battery HB into a single-phase AC voltage in approximately rectangular wave shape. The inverter circuit 13 is a full-bridge switching circuit formed by full bridge connection of four switching elements 13A, 13B, 13C and 13D each of which is driven according to a switching signal supplied from the control circuit 17. As the switching elements 13A, 13B, 13C and 13D, elements such as MOS-FET (Metal Oxide Semiconductor-Field Effect Transistor) and IGBT (Insulated Gate Bipolar Transistor) are used.

The switching element 13A is provided between one end of the primary winding 11A of the transformer 11 and the primary high-voltage line L1H, and the switching element 13B is provided between the other end of the primary winding 11A and the primary low-voltage line L1L. The switching element 13C is provided between the other end of the primary winding 11A and the primary high-voltage line L1H, and the switching element 13D is provided between one end of the primary winding 11A and the primary low-voltage line L1L. The resonance inductor 14 is connected between a connection point between the switching elements 13A and 13D, and one end of the primary winding 11A.

Thus, in the inverter circuit 13, in response to on operation of the switching elements 13A and 13B, current flows along a first current path from the primary high-voltage line L1H to the primary low-voltage line L1L through the switching element 13A, primary winding 11A and switching element 13B in this order, and on the other hand, in response to on operation of the switching elements 13C and 13D, current flows along a second current path from the primary high-voltage line L1H to the primary low-voltage line L1L through the switching element 13C, primary winding 11A, resonance inductor 14 and switching element 13D in this order.

The transformer 11 is a magnetic element in which the primary winding 11A is magnetically coupled with the secondary windings 11B and 11C such that polarity of the primary winding 11A is the same as polarity of the secondary windings 11B and 11C. A pair of the secondary windings 11B and 11C of the transformer 11 are connected to each other by a center tap C, and the center tap C is connected to the output terminal T4 via the ground line LG. That is, the switching power supply unit is a center-tap-type one. Thus, the transformer 11 transforms (steps down) an AC voltage converted by the inverter circuit 13, and outputs AC voltages VO1 and VO2, of which the phases are shifted by 180 degrees from each other, from respective ends A and B of the pair of secondary windings 11B and 11C. In this case, a level of voltage transformation is determined by a turn ratio between the primary winding 11A and the secondary windings 11B and 11C.

While the resonance inductor 14 may be configured by actually disposing a coil component, instead of this, or in conjunction with this, it may be configured by using series inductance including leakage inductance (not shown) of the transformer 11 and wirings.

The rectifier circuit 15 is in a single-phase full-wave rectification type including a pair of diodes 15A and 15B. An anode of the diode 15A is connected to one end A of the secondary winding 11B, and an anode of the diode 15B is connected to one end B of the secondary winding 11C, respectively. Cathodes of the diodes 15A and 15B are connected to each other at a connection point D, and connected to the output line LO. That is, the rectifier circuit 15 has a structure of cathode common connection, and separately rectifies the AC output voltages VO1 and VO2 of the transformer 11 in respective half-wave periods by the diodes 15A and 15B respectively, in order to obtain DC voltages.

The smoothing circuit 16 includes a choking coil 16A and a smoothing capacitor 16B. The choking coil 16A is inserted in the output line LO, and connected to the connection point D at one end, and connected to the output terminal T3 at the other end. The smoothing capacitor 16B is connected between the other end of the choking coil 16A and the ground line PG. According to such a configuration, the smoothing circuit 16 smoothes the DC voltage rectified by the rectifier circuit 15 to generate a DC output voltage Vout, and feeds the voltage Vout to the low-voltage battery LB from the output terminals T3 and T4.

Next, configurations of the voltage detection section 20 and other sections are described.

The voltage detection section 20 has a transformer 21 (voltage detection transformer), an emission circuit 22, a switching element 24, a drive circuit 25, and a pair of detection signal lines W1 and W2.

The transformer 21 includes a primary winding 21A (first transformer coil) and a secondary winding 21B (second transformer coil), and is a 2-winding forward transformer, in which the primary winding 21A is magnetically coupled with the secondary winding 21B such that polarity of the primary winding 21A is the same as polarity of the secondary winding 21B. One end of the primary winding 21A is connected to one end of an output terminal of the high-voltage battery HB via the emission circuit 22, and the other end of the primary winding 21A is connected to the other end of the output terminal of the high-voltage battery HA via the switching element 24. That is, the primary winding 21A and the switching element 24 are connected in series with each other between both ends of the high-voltage battery HB. On the other hand, one end of the secondary winding 21B is connected to one end of the detection signal line W1, and the other end of the secondary winding 21B is connected to one end of the detection signal line W2, respectively. The other end of each of the detection signal line W1 and the detection signal line W2 is connected to the holding section 26.

The emission circuit has a resistor 22A, a capacitor 22B and a diode 22C. One end of the resistor 22A is connected to one end of the primary winding 21A, one end of the capacitor 22B, and one end of the high-voltage battery HB, and the other end of the resistor 22A is connected to the other end of the capacitor 22B and a cathode of the diode 22C. Moreover, an anode of the diode 22C is connected to the other end of the primary winding 21A and one end of the switching element 24. According to such a configuration, the emission circuit 22 emits energy stored in the transformer 21 to be thermally consumed, which will be described in detail later.

The switching element 24 is disposed between the anode of the diode 22C and the primary winding 21A, and the other end of the high-voltage battery HB, and on/off operation of the switching element 24 is controlled by a drive circuit 25 supplied with power separately from the low-voltage battery LB. As the switching element 24, elements such as MOS-FET and IGBT are used similarly as the switching elements 13A, 13B, 13C and 13D.

The holding circuit 26 is, for example, a circuit in which a capacitor C is connected between the detection signal lines W1 and W2, and a diode 26A is inserted in the detection signal line W1. Specifically, an anode of the diode 26A is connected to one end of the secondary winding 21B, a cathode of the diode 26A is connected to one end of a capacitor 26B, and the other end of capacitor 26B is connected to the other end of the secondary winding 21B. In a voltage V2 induced between the detection signal lines W1 and W2, the holding circuit 26 holds a peak voltage Vp for a predetermined time, and supplies the voltage Vp being held to the comparison section 27, which will be described in detail later.

The comparison section 27 includes, for example, a comparator, and determines a level relation between an absolute value of the voltage Vp inputted from the holding section 26 and an absolute value of a reference voltage Vref. When the absolute value of the voltage Vp inputted from the holding section 26 is larger, outputs a control signal S into the control circuit 17, the control signal being for stopping a switching signal to be outputted from the control circuit 17 into the inverter circuit 13.

Next, operation of the switching power supply unit having a configuration as above is described in detail with reference to FIGS. 1 to 6. Hereinafter, operation of the power supply body unit 10, operation principle of the voltage detection section 20 as one of featured portions of the embodiment of the invention, and operation of a peripheral circuit of the voltage detection section 20 will be sequentially described.

First, operation of the power supply unit body 10 is described with reference to FIG. 1.

When the switching elements 13A and 13B of the inverter circuit 13 are turned on, current flows in a direction from the switching element 13A to the switching element 13B, and voltages VO1 and VO2 induced in the secondary windings 11B and 11C of the transformer 11 becomes in a reverse direction with respect to the diode 15B, and in a forward direction with respect to the diode 15A. Therefore, current flows from the secondary winding 11B to the output line LO through the diode 15A.

Next, when the switching element 13B is turned off, and the switching element 13C is turned on, a voltage −VO2 induced in the secondary winding 11C of the transformer 11 becomes in a forward direction with respect to the diode 15B. Therefore, current flows from the secondary winding 11C to the output line LO through the diode 15B.

When the switching elements 13C and 13D are turned on, current flows in a direction from the switching element 13C to the switching element 13D, and voltages −VO1 and −VO2 induced in the secondary windings 11B and 11C of the transformer 11 becomes in a forward direction with respect to the diode 15B, and in a reverse direction with respect to the diode 15A. Therefore, current flows from the secondary winding 11C to the output line LO through the diode 15B.

Next, when the switching element 13C is turned off, and the switching element 13B is turned on, a voltage −VO1 induced in the secondary winding 11B of the transformer 11 becomes in a forward direction with respect to the diode 15A. Therefore, current flows from the secondary winding 11B to the output line LO through the diode 15A.

In this way, the power supply body unit 10 transforms (steps down) the DC input voltage Vain supplied from the high-voltage battery HB into the DC output voltage Vout, and feeds the transformed DC output voltage Vout to the low-voltage battery LB.

Next, operation principle of the voltage detection circuit 20 and operation of a peripheral circuit of the voltage detection circuit 20 are described with reference to FIGS. 2 to 6.

Figure 2:
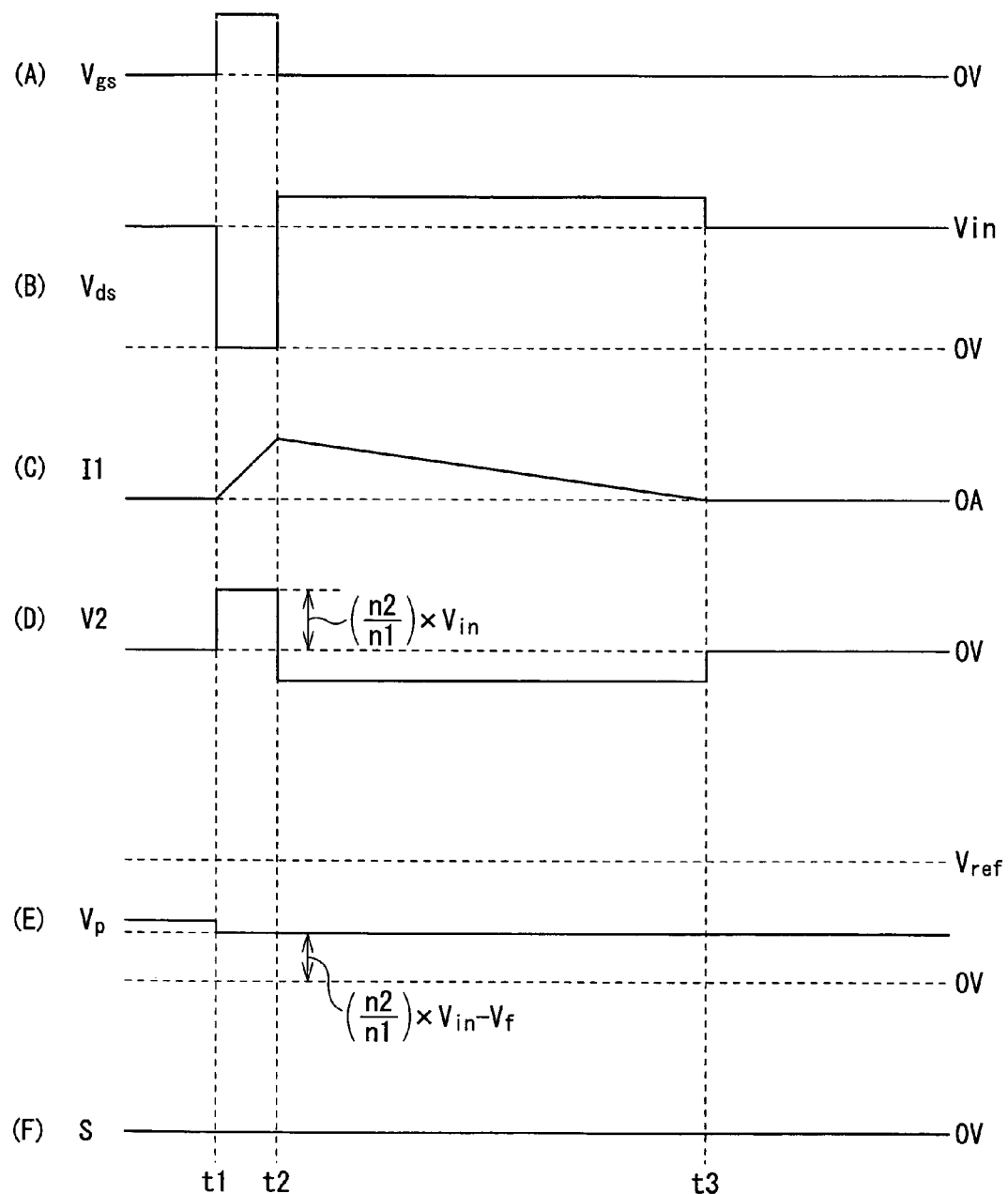
FIG. 2 shows timing waveform charts for explaining an operation principle of a voltage detection section in FIG. 1.
Figure 3:
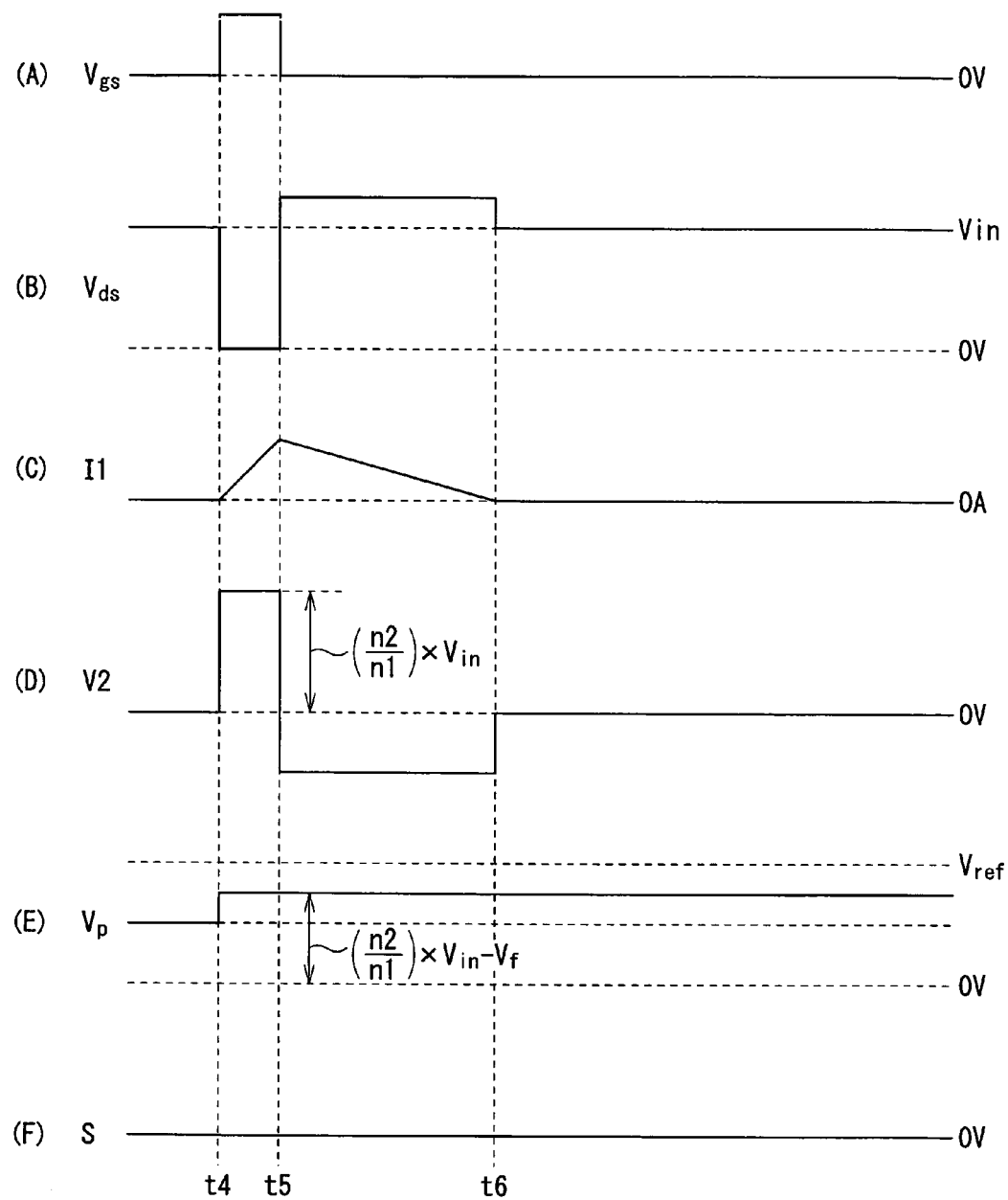
FIG. 3 shows another timing waveform charts for explaining the operation principle of the voltage detection section in FIG. 1.
Figure 4:
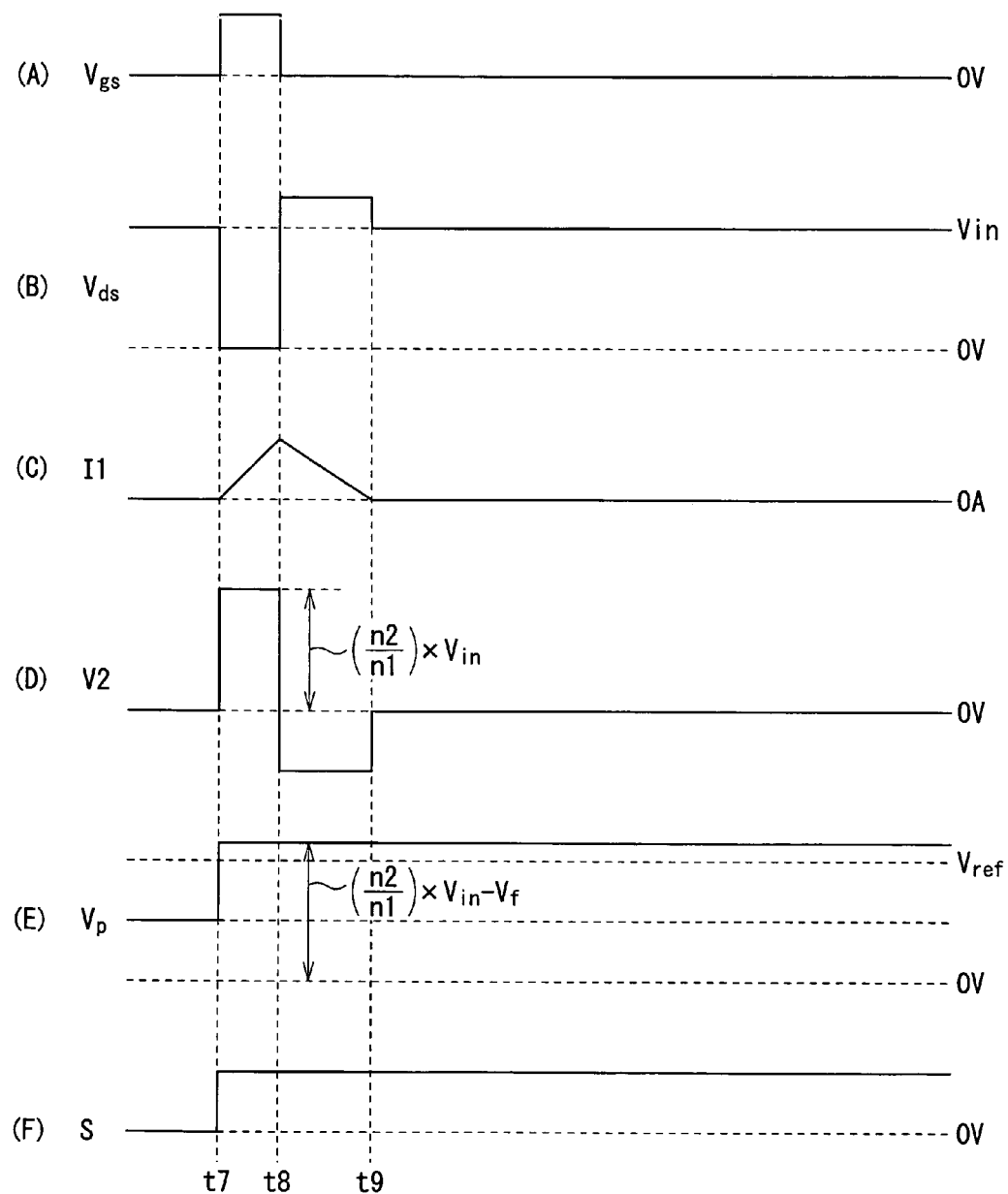
FIG. 4 shows further another timing waveform charts for explaining the operation principle of the voltage detection section in FIG. 1.
Figure 5:
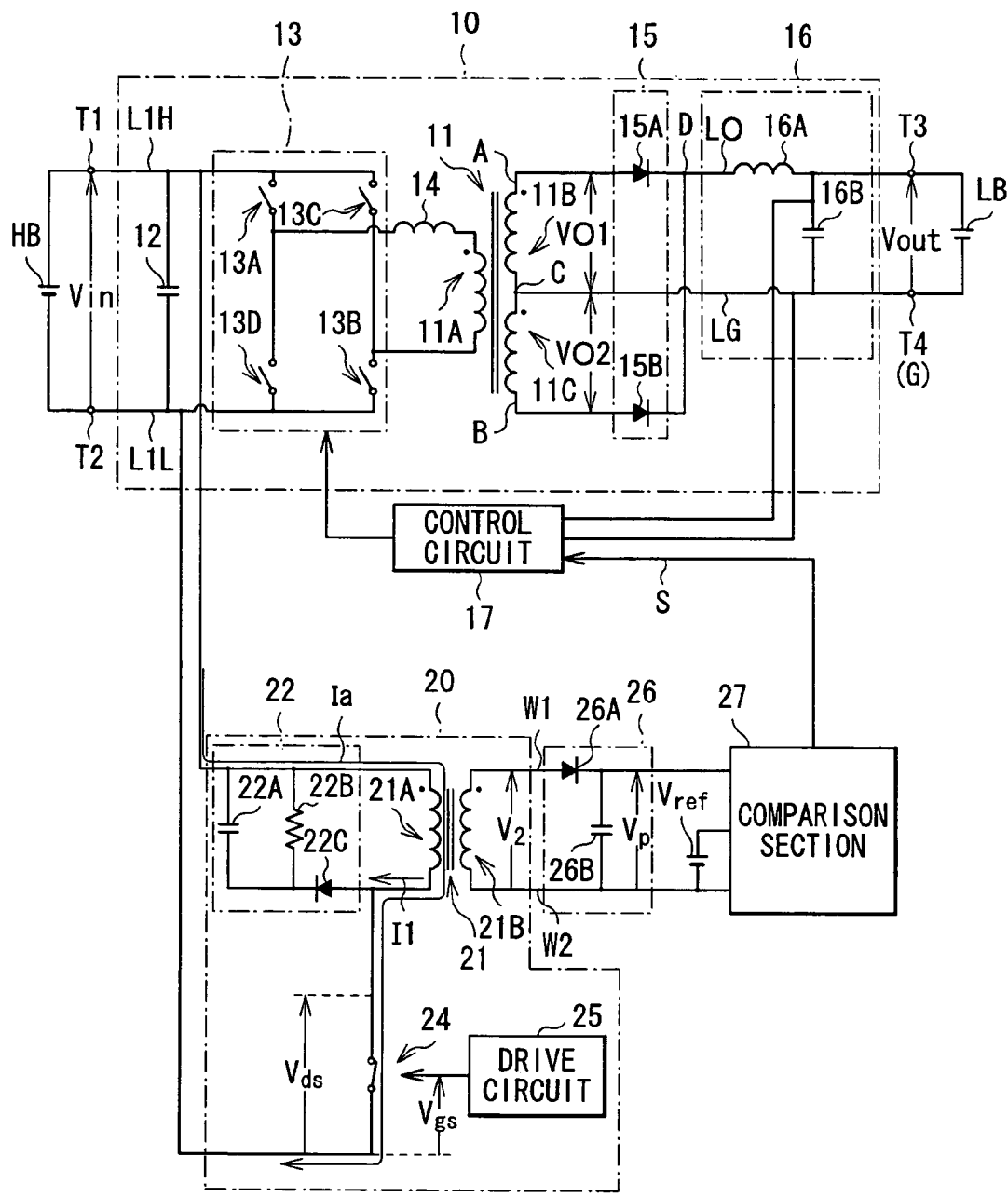
FIG. 5 shows a circuit diagram for explaining the operation principle of the voltage detection section in FIG. 1.
Figure 6:
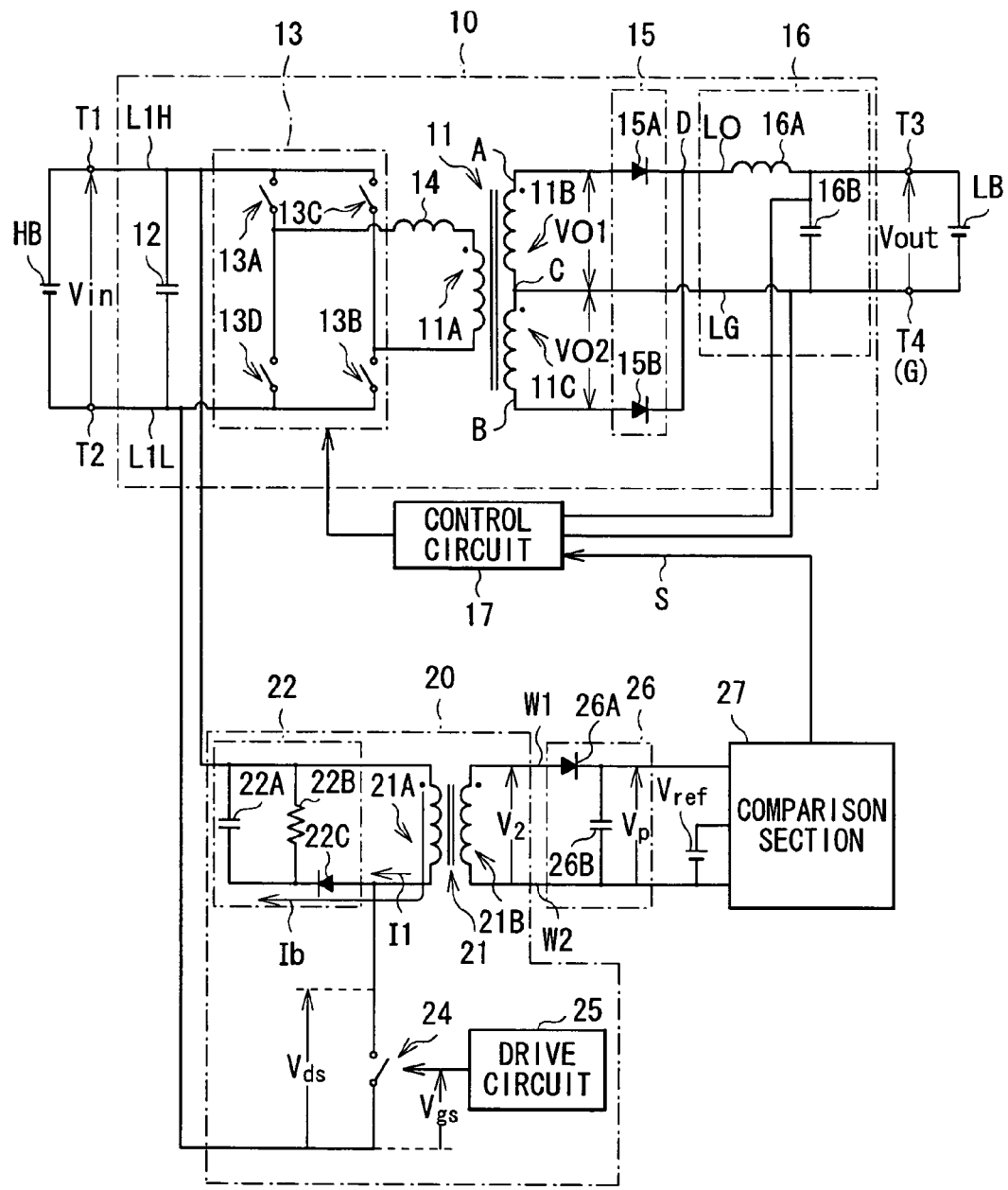
FIG. 6 shows another circuit diagram for explaining the operation principle of the voltage detection section in FIG. 1.

Here, FIG. 2 shows an example of respective waveform charts when the DC input voltage Vin is in a lower site within a range where an internal circuit is not broken (hereinafter, referred to as "within a secure range"), FIG. 3 shows an example of respective waveform charts when the DC input voltage Vain is in an upper site within the secure range, and FIG. 4 shows an example of respective waveform charts when the DC input voltage Vin is large compared with an absolute value of the reference voltage Vref being an upper limit of the secure range, respectively. FIG. 5 is for explaining operation while the switching element 24 is on (period between timing t1 and timing t2, timing t4 and timing t5, or timing t7 and timing t8 as will be described later), and FIG. 6 is for explaining operation while the switching element 24 is off (period between timing t2 and timing t3, timing t5 and timing t6, or timing t8 and timing t9 as will be described later), respectively.

(A) in FIGS. 2, 3 and 4 show a voltage (when the switching element 24 is MOS-FET, it is a voltage applied between a gate and a source) Vgs of a switching signal outputted from the drive circuit 25 into the switching element 24; (B) in FIGS. 2, 3 and 4 show a voltage (when the switching element 24 is MOS-FET, it is a voltage between a drain and a source) Vds between both ends of the switching element 24; (C) in FIGS. 2, 3 and 4 show a current I1 flowing through the primary winding 21A; (D) in FIGS. 2, 3 and 4 show a voltage (output voltage of the voltage detection section 20) V2 induced in the secondary winding 21B; (E) in FIGS. 2, 3 and 4 show a voltage (peak voltage) Vp held by the holding section 26; and (F) in FIG. 2, 3 and 4 show a voltage of a control signal S outputted from the comparison section 7 into the control circuit 17 respectively, and arrows shown in FIGS. 1, 5 and 6 indicate a positive direction.

When a pulse-like switching signal is outputted from the drive circuit 25 at timing t1, t4 or t7, and the switching element 24 is turned on, as shown in (A) in FIGS. 2, 3, 4 and FIG. 5, the voltage Vds between both ends of the switching element 24 falls to 0 V as shown in (B) in FIGS. 2, 3 and 4. Moreover, as shown in FIG. 5, current flows along a current path Ia from the input terminal T1 to the input terminal T2 through the primary winding 21A and the switching element 24. Accordingly, the current I1 flowing through the primary winding 21A is increased with a ratio of slope Vin/L1 as shown in (C) in FIGS. 2, 3 and 4. Here, L1 is inductance of the primary winding 21A. Thus, while the switching element 24 is on, the transformer 21 is intermittently applied with the DC input voltage Vin so that energy is stored therein, and the voltage V2 is induced between the anode of the diode 26A and the other end of the secondary winding 21B as shown in (D) in FIGS. 2, 3 and 4. Here, the voltage V2 corresponds to (n2/n1)×Vin while the current I1 is increased, and falls to zero when increase of the current is terminated. Here, n1 is the number of turns of the primary winding 21A, and n2 is the number of turns of the secondary winding 21B. The voltage V2 contains information of the DC input voltage Vin, but does not include the DC output voltage Vout, as the current I1.

When the voltage (n2/n1)×Vin being a source of the peak voltage Vp is induced in the secondary winding 21B, the holding section 26 holds a voltage (peak voltage Vp=((n2/n1)×Vain−Vf) for a predetermined time, the voltage being corresponding to a voltage obtained by subtracting a forward voltage Vf of the diode 26A from the voltage (n2/n1)×Vin, and outputs it into the comparison section 27, as shown in (E) in FIGS. 2, 3 and 4.

When the peak voltage Vp is inputted from the holding section 26, the comparison section 27 determines a level relation between the peak voltage Vp and the reference voltage Vref. Here, the reference voltage Vref is assumed to be a value (n2/n1)×(Vmax+Vf)−Vf, which corresponds to a value obtained in a way that an upper limit value Vmax within the secure range is added with the forward voltage Vf, then a resultant value is divided by 'n1/n2', and then a resultant value is subtracted with the forward voltage Vf.

Here, when a peak voltage Vp having a level as shown in (E) in FIG. 2 or in FIG. 3 is inputted, the comparison section 27 determines that the DC input voltage Vin is within the secure range, and does not output the control signal S for stopping the switching signal to be outputted from the control circuit 17 into the inverter circuit 13 as shown in (F) in FIGS. 2 and 3. On the other hand, when a peak voltage Vp having a level as shown in (E) in FIG. 4 is inputted, the comparison section 27 determines that the DC input voltage Vin is more than the secure range, and outputs the control signal S at the timing t7 as shown in (F) in FIG. 4. For example, when the control circuit 17 receives the control signal S, it stops outputting the switching signal. In this way, the internal circuit is protected from an excessively large DC input voltage Vin.

After output of the switching signal has been stopped, when the peak voltage Vp having the level as shown in (E) in FIG. 2 or FIG. 3 is inputted, the comparison section 27 determines that the DC input voltage Vin is returned to be within the secure range, and for example, stops outputting the switching signal S. As a result, a switching signal is outputted from the control circuit 17 into the inverter circuit 13.

Then, as shown in (A) in FIGS. 2, 3, 4 and FIG. 6, when the switching element 24 is turned off at timing t2, t5 or t8, current flows along a current path Ib from the primary winding 21A to the emission circuit 22 as shown in FIG. 6. Thus, energy stored in the transformer 21 is emitted to the emission circuit 22 and thermally consumed, as a result, a core of the transformer 21 is reset.

When the switching element 24 is turned off, the current I1 flowing through the primary winding 21A is decreased with a ratio of slope −(V22B/L1) for a period to timing t3, t6 or t9 as shown in (C) in FIGS. 2, 3 and 4. V22B is a voltage applied between both ends of the capacitor 22B.

In this way, in the switching power supply unit of an embodiment of the invention, when the switching element 24 is switched to be turned on in the voltage detection section 20, the DC input voltage Vin from the high-voltage battery HB is converted into the pulse-like voltage, and the current I1 flows through the primary winding 21A. Then, the current I1 flowing through the primary winding 21A induces the pulse-like voltage V2 in the secondary winding 21B. Here, since the current I1 flowing through the primary winding 21A contains the information of the DC input voltage Vin from the high-voltage battery HB, the voltage V2 induced in the secondary winding 21B also contains the information of the DC input voltage Vain from the high-voltage battery HB. In this way, the voltage containing the information of the DC input voltage Vin from the high-voltage battery HB is directly detected from the output ends (input terminals T1 and T2) of the high-voltage battery HB by the voltage detection section 20.

As hereinbefore, in the embodiment, the primary winding 21A in the voltage detection section 20 is connected to the input terminals T1 and T2 being connected to the output ends of the high-voltage battery HB via the switching element 24, thereby the voltage containing the information of the DC input voltage Vin is directly detected from the output ends of the high-voltage battery HB, therefore even if the DC output voltage Vout is varied, a value of the DC input voltage Vin can be accurately detected. Moreover, even if switching operation of the power supply main section 10 is stopped, the voltage detection section 20 can detect the voltage containing the information of the DC input voltage Vin.

Moreover, since the voltage detection section 20 is configured to allow the transformer 21 and a single switching element 24 to be connected in series with each other between both ends of the high-voltage battery HB, that is, configured to be in the so-called forward type, the voltage detection section 20 can be in a simple configuration compared with a so-called double forward type in a second embodiment as will be described later.

Moreover, as known from waveform charts of FIG. 2 to FIG. 4, since the voltage detection section 20 has approximately perfect, linear input/output characteristic, the DC input voltage Vin can be accurately detected only by simply inputting the peak voltage Vp into a comparator. Therefore, the peak voltage Vp need not be purposely corrected using an arithmetic circuit unlike the Japanese Unexamined Patent Publication No. 2003-33015, and thus detection speed of the DC input voltage Vin can be increased. To detect the DC input voltage Vin more accurately, a value of a detected DC input voltage Vin is preferably not varied depending on change in temperature of external environment, and for example, values of n1 and n2 are preferably set such that the peak voltage Vp is large in such a level that fluctuation of the forward voltage Vf can be negligible.

Moreover, even if the DC output voltage Vout is varied, since the value of the detected DC input voltage Vin is not affected thereby, the DC output voltage Vout need not be stabilized by purposely providing a regulator unlike the Japanese Unexamined Patent Publication No. 2003-33015. Accordingly, a configuration of the switching power supply unit can be simplified.

Moreover, since the emission circuit 22 of emitting the energy stored in the transformer 21 is provided in the voltage detection section 20, the core of the transformer 21 can be reset. Accordingly, for example, even if the DC input voltage Vin falls to 0 V, the voltage containing the information of the DC input voltage Vin can be detected.

Moreover, since the switching power supply unit has the holding section 26 of holding the output voltage (peak voltage Vp) of the detection signal line W1 or W2 when the switching element 24 is on, and the comparison section 27 of outputting the control signal S for stopping the switching operation of the power supply main section 10 when the absolute value of the peak voltage Vp held by the holding section 26 is larger than the absolute value of the reference voltage Vref, the switching operation of the power supply main section 10 can be stopped based on the voltage containing the information of the DC input voltage Vin detected by the voltage detection section 20.

Moreover, since the power supply main section 10 is configured by the step-down DC-DC converter of converting the high DC input voltage Vin into the relatively low DC output voltage Vout, the holding section 26 and the comparison section 27 can be configured by using an element having low withstanding voltage. Accordingly, price of components of the element can be reduced compared with the case that the holding section 26 and the comparison section 27 are configured by an element having high withstanding voltage.

Furthermore, since the primary side (high voltage side) is electrically isolated and separated from the secondary side (low voltage side) in the voltage detection section 20, a secure configuration can be given.

While the case that the switching element 24 is provided between the other end of the primary wiring 21A and the other end of the high-voltage battery HB in the voltage detection section 20 is described in the embodiment, a switching element may be provided between one end of the primary wiring 21A and one end of the high-voltage battery HB.

Second Embodiment

Next, a second embodiment of the invention will be described.

Figure 7:
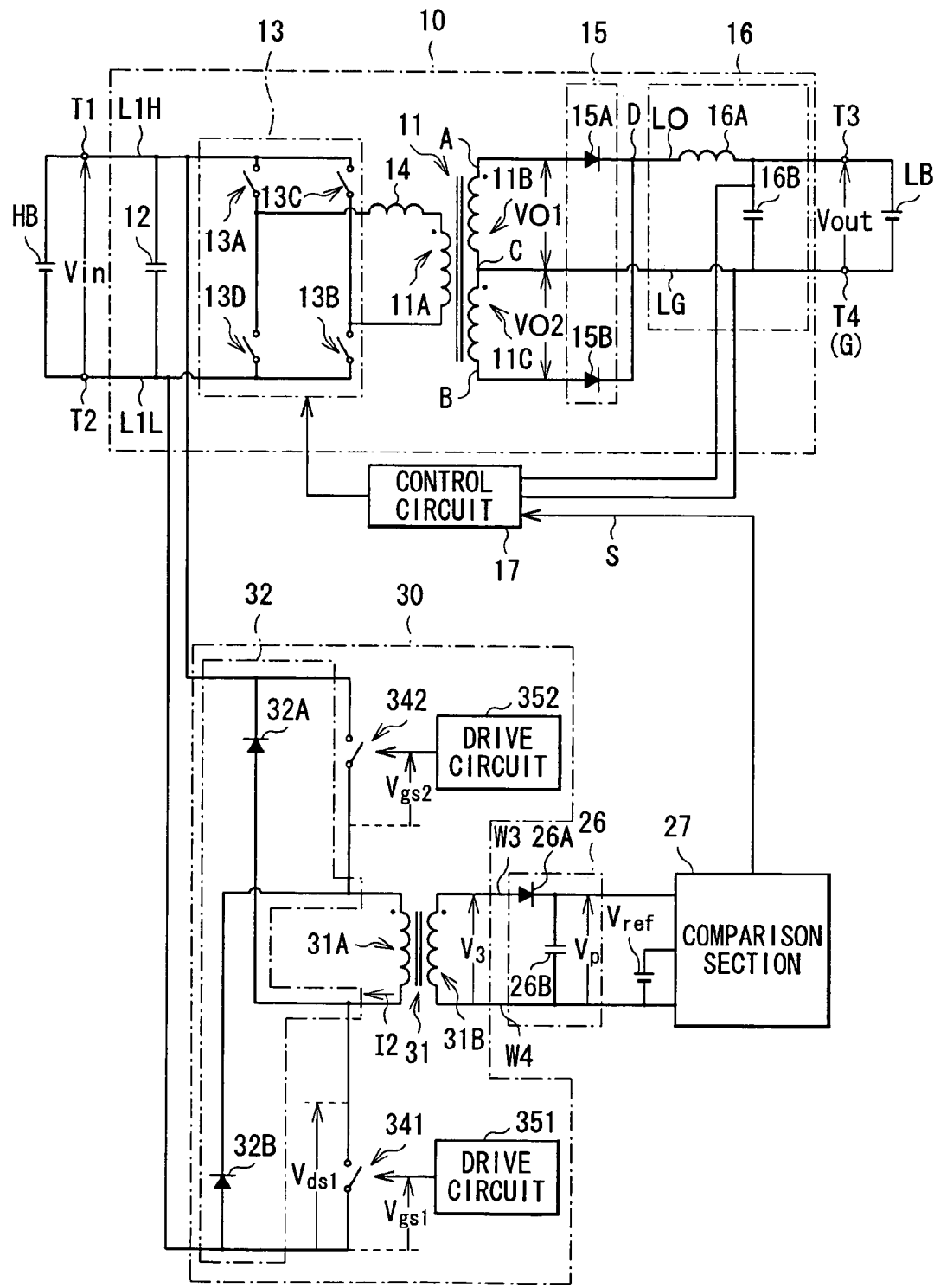
FIG. 7 shows a circuit diagram showing a configuration of a switching power supply unit according to a second embodiment of the invention.

FIG. 7 shows a circuit configuration of a switching power supply unit according to a second embodiment. In the figure, the same components as those shown in FIG. 1 are marked with the same references, and appropriately omitted to be described. In the switching power supply unit, a voltage detection section 30 is provided instead of the voltage detection section 20.

The voltage detection section 30 (voltage detection circuit) has a transformer 31 (voltage detection transformer), regeneration circuit 32, two switching elements 341 and 342, two drive circuits 351 and 352 respectively corresponding to the switching elements 341 and 342, and a pair of detection signal lines W3 and W4.

As the transformer 21 in the first embodiment, the transformer 31 includes a primary winding 31A (first transformer coil) and a secondary winding 31B (second transformer coil), which is a double forward transformer in which the primary winding 31A is magnetically coupled with the secondary winding 31B such that polarity of the primary winding 31A is the same as polarity of the secondary winding 31B. One end of the primary winding 31A is connected to one end of an output terminal of the high-voltage battery HB via the switching element 342 and the regeneration circuit 32, and the other end of the primary winding 31A is connected to the other end of the output terminal of the high-voltage battery HB via the switching element 341 and the regeneration circuit 32. That is, the primary winding 31A and the two switching elements 341 and 342 are connected in series with each other between both ends of the high-voltage battery HB. On the other hand, one end of the secondary winding 31B is connected to one end of the detection signal line W3, and the other end of the secondary winding 31B is connected to one end of the detection signal line W4, respectively. The other end of each of the detection signal line W3 and the detection signal line W4 is connected to the holding section 26.

The regeneration circuit 32 has two diodes 32A and 32B. An anode of the diode 32A is connected to the other end of the primary winding 31A, and a cathode thereof is connected to one end of the switching element 342 and one end of the high-voltage battery HB. An anode of the diode 32B is connected to the other end of the switching element 341 and the other end of the high-voltage battery HB, and a cathode thereof is connected to one end of the primary winding 31A. According to such a configuration, the regeneration circuit 32 regenerates energy stored in the transformer 31 for the high-voltage battery HB, which will be described in detail later.

The switching element 341 is disposed between the anode of the diode 32B and the other end of the high-voltage battery HB, and the other end of the primary winding 31A, and on/off operation of the switching element is controlled by a drive circuit 351 supplied with power separately from the low-voltage battery LB. On the other hand, the switching element 342 is disposed between the cathode of the diode 32A and one end of the high-voltage battery HB, and one end of the primary winding 31A, and on/off operation of the switching element is controlled by a drive circuit 352 supplied with power separately from the low-voltage battery LB. The switching elements 341 and 342 perform switching operation in synchronization with each other, which will be described in detail later. As the switching elements 341 and 342, elements such as MOS-FET and IGBT are used similarly as the switching element 24 in the first embodiment.

Next, operation of the switching power supply unit of the embodiment is described in detail with reference to FIGS. 8 to 12. Hereinafter, operation principle of the voltage detection section 30 as one of featured portions of an embodiment of the invention, and operation of a peripheral circuit of the voltage detection section 30 are sequentially described. Since operation of the power supply body unit 10 is the same as that described in the first embodiment, it is omitted to be described.

Figure 8:
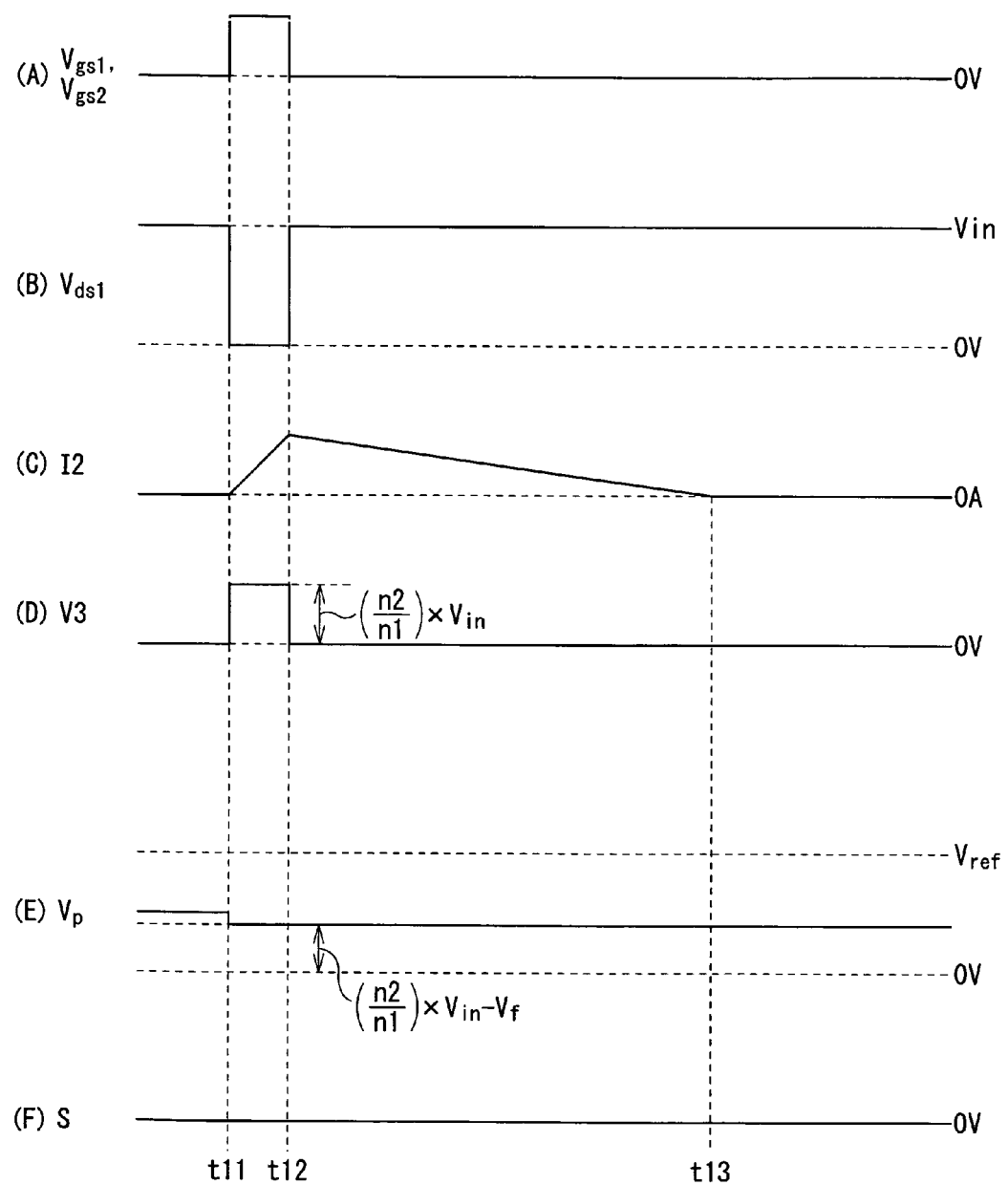
FIG. 8 shows timing waveform charts for explaining an operation principle of a voltage detection section in FIG. 7.
Figure 9:
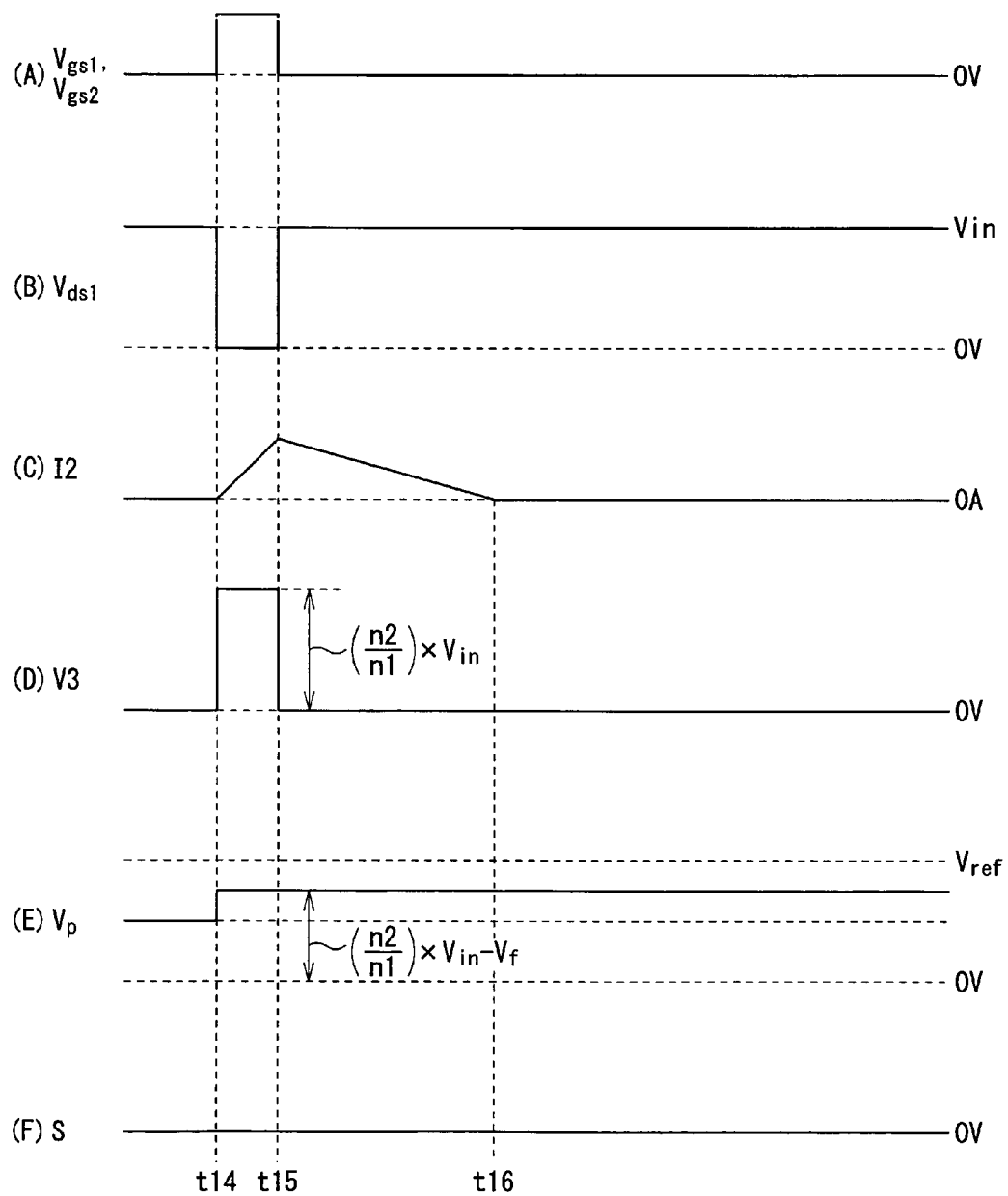
FIG. 9 shows another timing waveform charts for explaining the operation principle of the voltage detection section in FIG. 7.
Figure 10:
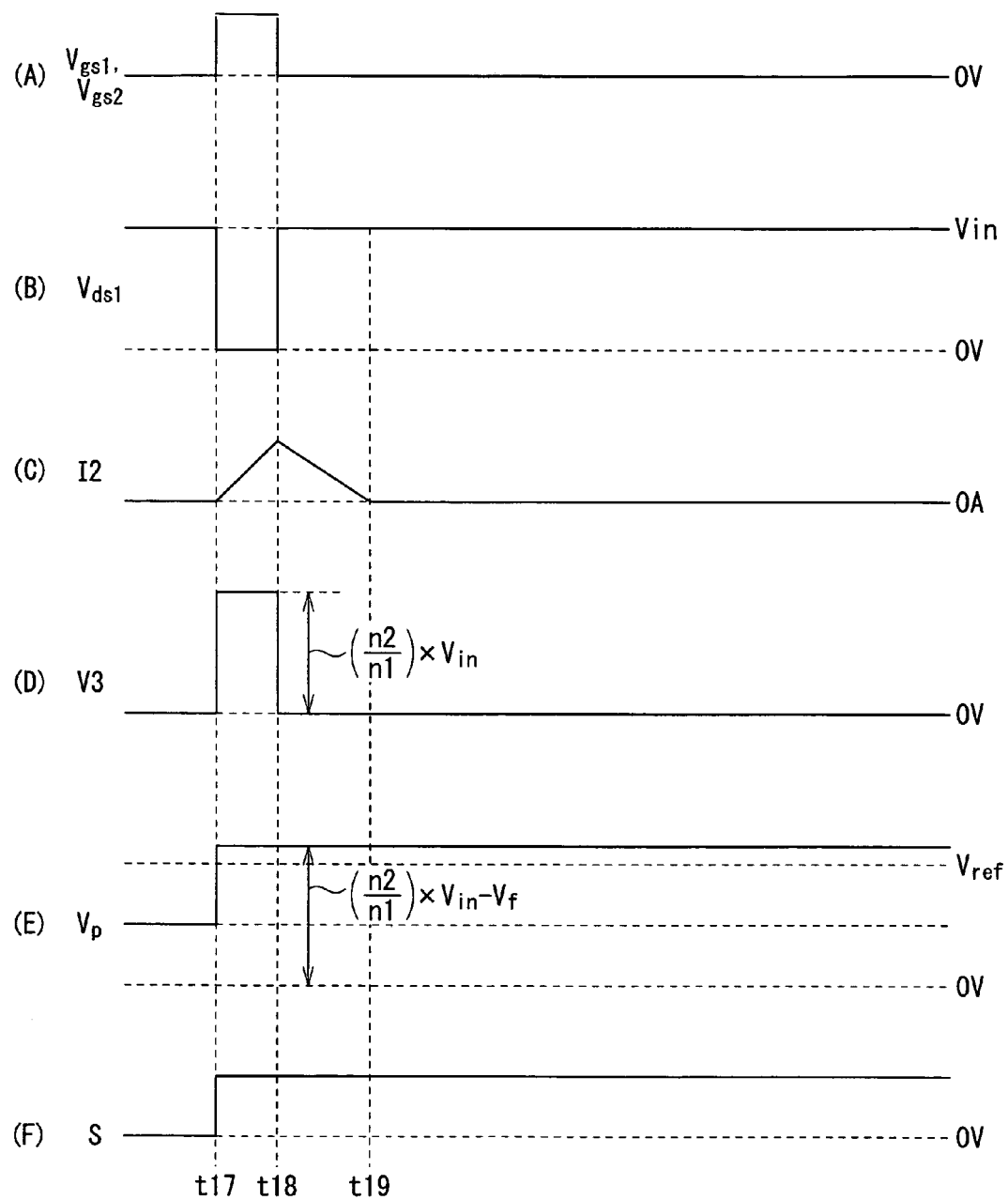
FIG. 10 shows further another timing waveform charts for explaining the operation principle of the voltage detection section in FIG. 7.
Figure 11:
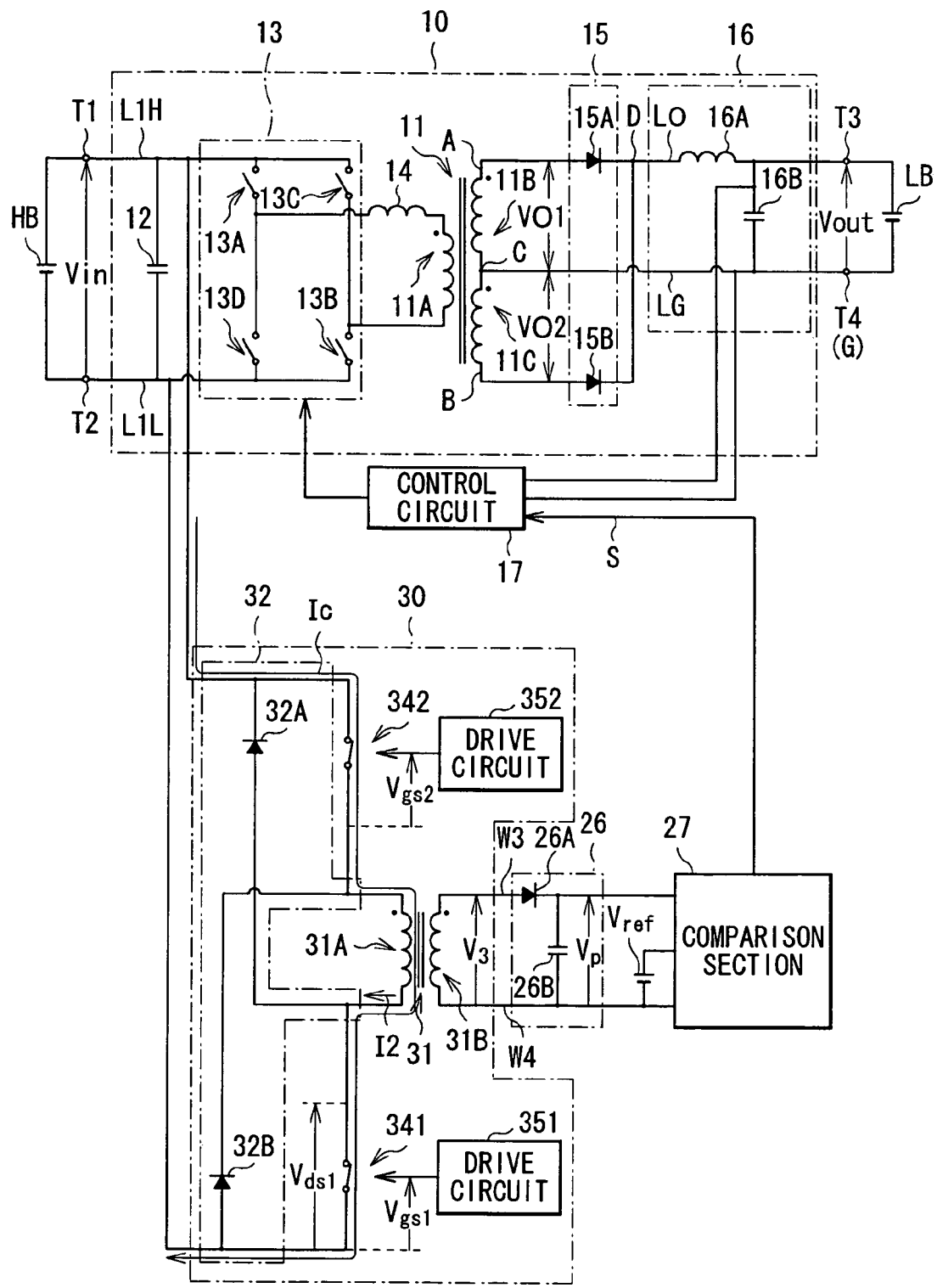
FIG. 11 shows a circuit diagram for explaining the operation principle of the voltage detection section in FIG. 7.
Figure 12:
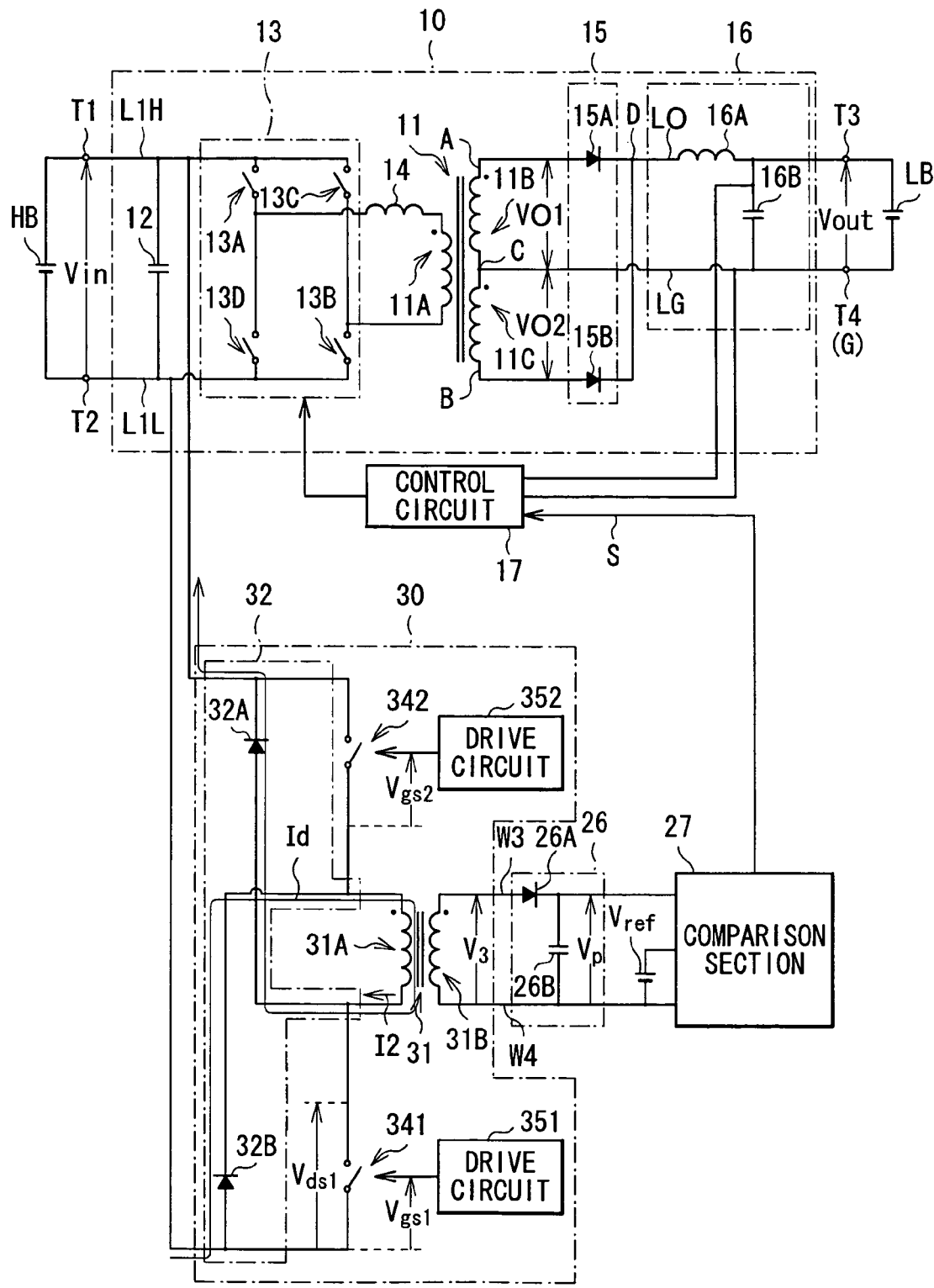
FIG. 12 shows another circuit diagram for explaining the operation principle of the voltage detection section in FIG. 7.

Here, FIG. 8 shows an example of respective waveform charts when the DC input voltage Vin is in a lower site within a range where an internal circuit is not broken (hereinafter, referred to as "within a secure range"), FIG. 9 shows an example of respective waveform charts when the DC input voltage Vin is in an upper site within the secure range, and FIG. 10 shows an example of respective waveform charts when the DC input voltage Vin is large compared with an absolute value of the reference voltage Vref being an upper limit of the secure range, respectively. FIG. 11 is for explaining operation while the switching elements 341 and 342 are on (period between timing t11 and timing t12, timing t14 and timing t15, or timing t17 and timing t18 as will be described later), and FIG. 12 is for explaining operation while the switching elements 341 and 342 are off (period between timing t12 and timing t13, timing t15 and timing t16, or timing t18 and timing t19 as will be described later), respectively.

(A) in FIGS. 8, 9 and 10 show voltages (when the switching elements 341 and 342 are MOS-FET, they are voltages applied between a gate and a source) Vgs1 and Vgs2 of switching signals outputted from the drive circuits 351 and 352 into the switching elements 341 and 342; (B) in FIG. 8, 9 and 10 show a voltage (when the switching element 341 is MOS-FET, it is a voltage between a drain and a source) Vds1 between both ends of the switching element 341; (C) in FIGS. 8, 9 and 10 show a current I2 flowing through the primary winding 31A; (D) in FIGS. 8, 9 and 10 show a voltage (output voltage of the voltage detection section 30) V3 induced in the secondary winding 31B; (E) in FIGS. 8, 9 and 10 show a voltage (peak voltage) Vp held by the holding section 26; and (F) in FIG. 8, 9 and 10 show a voltage of a control signal S outputted from the comparison section 27 into the control circuit 17 respectively, and arrows shown in FIGS. 7, 11 and 12 indicate a positive direction.

When pulse-like switching signals are outputted from the drive circuits 351 and 352 at timing t11, t14 or t17, and the switching elements 341 and 342 are turned on, as shown in (A) in FIGS. 8, 9, 10 and FIG. 11, the voltage Vds1 between both ends of the switching element 341 (and voltage Vds2 between both ends of the switching element 342, while not shown) falls to 0 V as shown in (B) in FIGS. 8, 9 and 10. Moreover, as shown in FIG. 11, current flows along a current path Ic from the input terminal T1 to the input terminal T2 through the switching element 342, primary winding 31A, and switching element 341. Accordingly, the current I2 flowing through the primary winding 31A is increased with a ratio of slope Vin/L1 as shown in (C) in FIGS. 8, 9 and 10. Thus, while the switching elements 341 and 342 are on, the transformer 31 is intermittently applied with the DC input voltage Vin so that energy is stored therein, and the voltage V3 is induced between the anode of the diode 26A and the other end of the secondary winding 31B as shown in (D) in FIGS. 8, 9 and 10. Here, the voltage V3 corresponds to $(n2/n1) \times Vin$ while the current I2 is increased, and falls to zero when increase of the current is terminated. Here, n1 is the number of turns of the primary winding 31A, and n2 is the number of turns of the secondary winding 31B. The voltage V3 contains information of the DC input voltage Vin, but does not include the DC output voltage Vout, as the current I2.

When the voltage $(n2/n1) \times Vin$ being a source of the peak voltage Vp is induced in the secondary winding 31B, the holding section 26 holds a voltage (peak voltage $Vp=((n2/n1) \times Vin - Vf)$ for a predetermined time, the voltage being corresponding to a voltage obtained by subtracting a forward voltage Vf of the diode 26A from the voltage $(n2/n1) \times Vin$, and outputs it into the comparison section 27, as shown in (E) in FIGS. 8, 9 and 10.

When the peak voltage Vp is inputted from the holding section 26, the comparison section 27 determines a level relation between the peak voltage Vp and the reference voltage Vref. Here, the reference voltage Vref is assumed to be a value $(n2/n1) \times (Vmax+Vf)-Vf$, which is corresponding to a value obtained in a way that an upper limit value Vmax within the secure range is added with the forward voltage Vf, then a resultant value is divided by 'n1/n2', and then a resultant value is subtracted with the forward voltage Vf.

Here, when a peak voltage Vp having a level as shown in (E) in FIG. 8 or FIG. 9, the comparison section 27 determines that the DC input voltage Vin is within the secure range, and does not output the control signal S as shown in (F) in FIGS. 8 and 9. On the other hand, when a peak voltage Vp having a level as shown in (E) in FIG. 10, the comparison section 27 determines that the DC input voltage Vin is more than the secure range and outputs the control signal S at the timing t17 as shown in (F) in FIG. 10. For example, when the control circuit 17 receives the control signal S, it stops outputting the switching signal. In this way, the internal circuit is protected from an excessively large DC input voltage Vin.

After output of the switching signal has been stopped, when the peak voltage Vp having the level as shown in (E) in FIG. 8 or FIG. 9 is inputted, the comparison section 27 determines that the DC input voltage Vin is returned to be within the secure range, and for example, stops outputting the switching signal S. As a result, a switching signal is outputted from the control circuit 17 into the inverter circuit 13.

Then, as shown in (A) in FIGS. 8, 9, 10 and FIG. 12, when the switching elements 341 and 342 are turned off at timing t12, t15 or t18, current flows along a current path Id from the other end of the high-voltage battery HB to one end of the high-voltage battery HB through the diode 32B, primary winding 31A and diode 32A, as shown in FIG. 12. Thus, energy stored in the transformer 21 is regenerated for the high-voltage battery HB, as a result, a core of the transformer 31 is reset.

When the switching elements 341 and 342 are turned off, the current I2 flowing through the primary winding 31A is decreased with a ratio of slope $-(Vin/L1)$ for a period to timing t13, t16 or t19 as shown in (C) in FIGS. 8, 9 and 10. While the current I2 flows along the path of the primary winding 31A, the current contains information of the DC input voltage Vin, but does not include information of the DC output voltage Vout.

As hereinbefore, in the embodiment, the primary winding 31A in the voltage detection section 30 is connected to the input terminals T1 and T2 being connected to output ends of the high-voltage battery HB via the two switching elements 341 and 342, thereby the voltage containing the information of the DC input voltage Vin is directly detected from the output ends of the high-voltage battery HB, therefore the same advantage as in the first embodiment can be obtained. That is, even if the DC output voltage Vout is varied, a value of the DC input voltage Vin can be accurately detected. Moreover, even if the switching operation of the power supply main section 10 is stopped, the voltage detection section 30 can detect the voltage containing the information of the DC input voltage Vin.

Moreover, since the regeneration circuit 32 of regenerating the energy stored in the transformer 31 is provided in the voltage detection section 30, the core of the transformer 31 can be reset. Accordingly, for example, even if the DC input voltage Vin falls to 0 V, the voltage containing the information of the DC input voltage Vin can be detected. Moreover, since the stored energy can be regenerated for the high-voltage battery HB, power loss can be reduced compared with the case of providing the emission circuit 22 described in the first embodiment.

Figure 13:
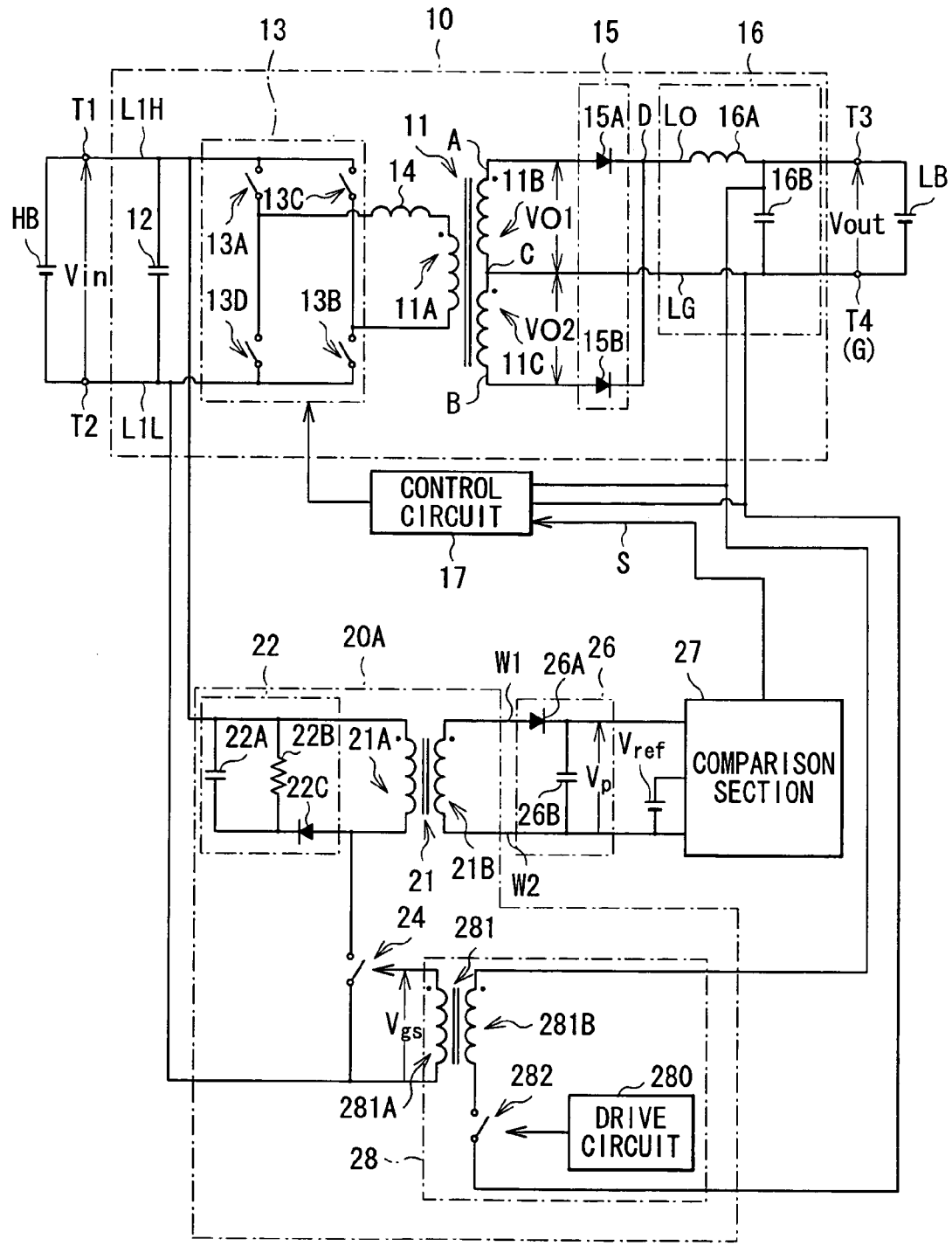
FIG. 13 shows a circuit diagram showing a configuration of a switching power supply unit according to a modification of the first embodiment.
Figure 14:
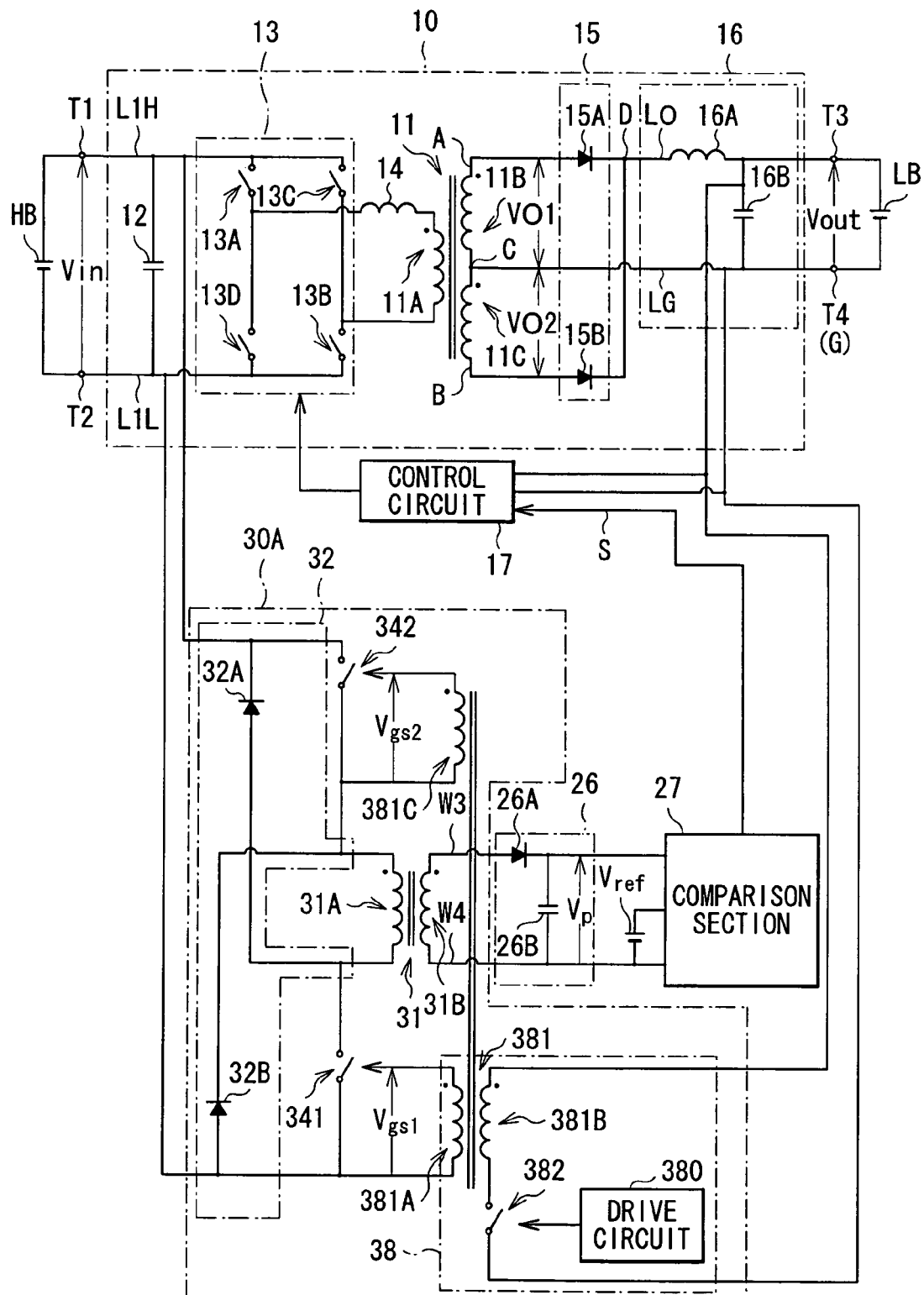
FIG. 14 shows a circuit diagram showing a configuration of a switching power supply unit according to a modification of the second embodiment.

While the case that the switching elements 24, 341 and 342 are controlled by the drive circuits 25, 351 and 352 separately applied with power from the low-voltage battery LB. respectively is described in the first and second embodiments, for example, as the voltage detection sections 20A and 30A shown in FIGS. 13 and 14 respectively, the switching elements 24, 341 and 342 may be controlled by drive sections 28 and 38 applied with power from the low-voltage battery LB. That is, the switching elements 24, 341 and 342 may be driven by using power supplied from the low-voltage battery LB. Specifically, the drive section 28 has a drive circuit 280, a transformer 281 having a primary winding 281A and a secondary winding 281B, and a switching element 282. On/off operation of the switching element 24 is controlled by a voltage Vgs induced between both ends of the primary winding 281A, and one end of the secondary winding 281B is connected to the output terminal T3, the other end of the secondary winding 281B is connected to one end of the switching element 282, the other end of the switching element 282 is connected to the output terminal T4, and on/off operation of the switching element 282 is controlled by the drive circuit 280. On the other hand, the drive section 38 has a drive circuit 380, a transformer 381 having primary windings 381A, 381C and a secondary winding 381B, and a switching element 382. On/off operation of the switching element 341 is controlled by a voltage Vgs1 induced between both ends of the primary winding 381A, and on/off operation of the switching element 342 is controlled by a voltage Vgs2 induced between both ends of the primary winding 381C, and one end of the secondary winding 381B is connected to the output terminal T3, the other end of the secondary winding 381B is connected to one end of the switching element 382, the other end of the switching element 382 is connected to the output terminal T4, and on/off operation of the switching element 382 is controlled by the drive circuit 380. According to such a configuration, since the voltage detection sections 20A and 30A are supplied with power from the low-voltage battery LB. being a stable power supply, an advantage that operation of the voltage detection sections can be stabilized is given in addition to the advantages of the embodiments. Moreover, since the switching elements are driven by using power supplied from a second power supply at a low voltage side, elements being drive elements in the drive sections 28 and 38 can be configured by elements having low withstanding voltage, consequently component price can be reduced.

In the first and second embodiments, the voltage V2 or V3 induced in the secondary winding 21B or 31B is designed to be inputted into the comparison section 27 via the holding section 26, so that a value of the voltage inputted from the secondary winding 21B and 31B into the comparison section 27 is equal to a value of the peak voltage Vp at any time; however, the voltage V2 or V3 induced in the secondary winding 21B and 31B may be designed to be directly inputted into the comparison section 27 rather than via the holding section 26. However, in this case, since the voltage inputted into the comparison section 27 has the same value as that of the peak voltage Vp only for a period while the switching elements 24, 341 and 342 are on, for example, it is necessary to provide a sampling mechanism in the control circuit 17, the mechanism being able to determine only a signal inputted from the comparison section 27 into the control circuit 17 in the period as an effective signal.

Moreover, while a circuit configuration of the switching power supply unit is described with a specific configuration in the first and second embodiments, the circuit configuration is not limited to this. For example, the inverter circuit may be configured in a full bridge type using 4 switching elements, forward type using 1 or 2 switching elements, or half-bridge type using 2 switching elements.

Moreover, while the case that the power supply body unit 10 is configured by a step-down DC-DC converter of converting the high DC input voltage Vin into the relatively low DC output voltage Vout is described in the first and second embodiments, conversely, the power supply body unit 10 may be configured by a step-up DC-DC converter of converting a low DC input voltage Vin into a relatively high DC output voltage Vout.

Furthermore, while the voltage detection section of detecting the DC input voltage Vin at a high voltage side of the switching power supply unit is described as an example of the voltage detection circuit of an embodiment of the invention in the first and second embodiments, the voltage detection circuit of an embodiment of the invention can be used for a voltage detection section being preferable for detecting a high DC voltage induced between a pair of signal lines, the voltage being detected after it has been stepped down to a relatively low DC voltage.

Third Embodiment

Next, a third embodiment of the invention will be described.

Figure 15:
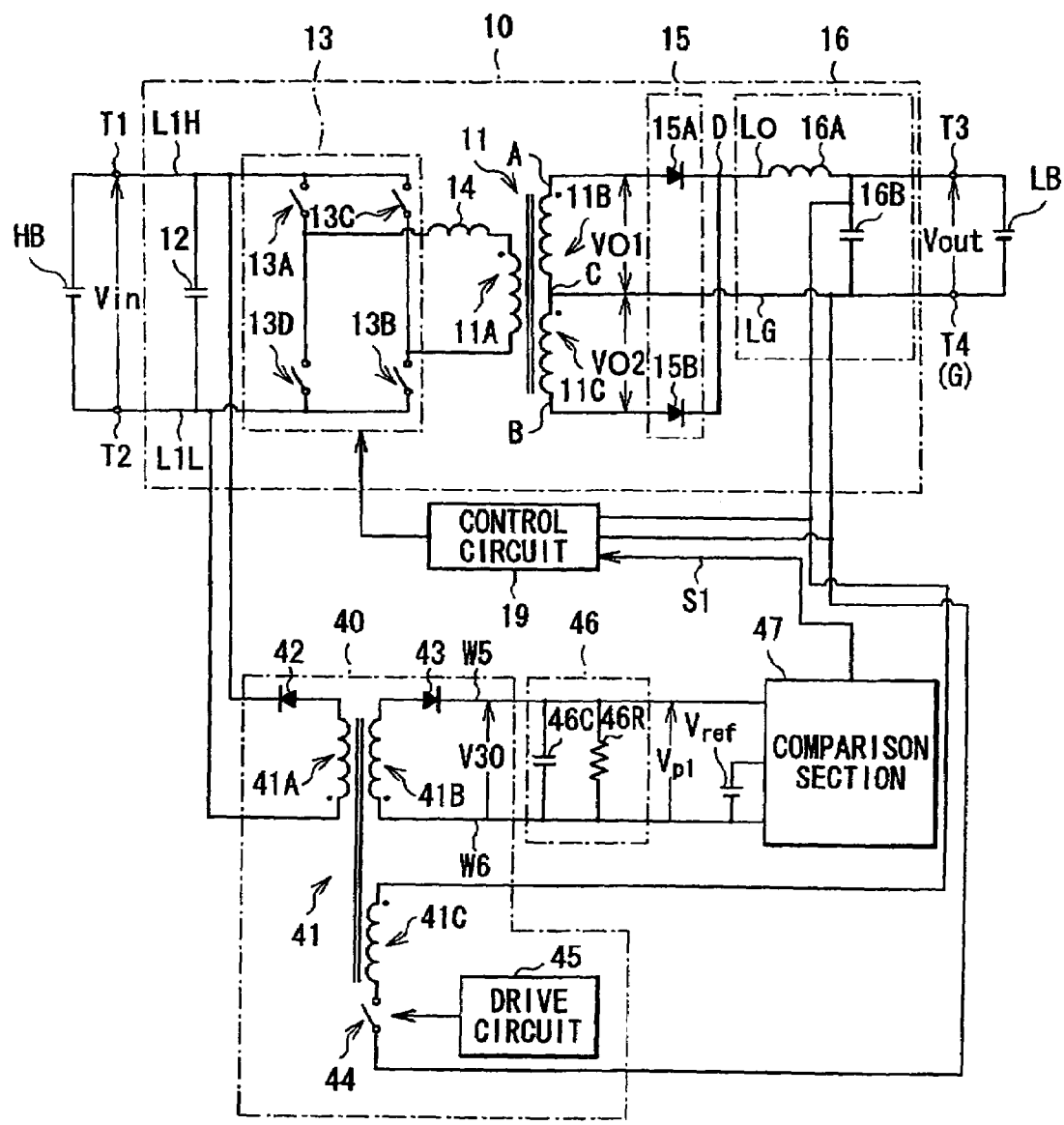
FIG. 15 shows a circuit diagram showing a configuration of a switching power supply unit according to a third embodiment of the invention.

FIG. 15 shows a configuration of a switching power supply unit according to a third embodiment. The switching power supply unit functions as a DC-DC converter of converting a high DC input voltage Vin supplied from a high-voltage battery HB (first power supply) into a relatively low DC output voltage Vout, and supplying the voltage Vout to a low-voltage battery LB. (second power supply), and is a switching power supply unit of which the secondary side is in center-tap cathode common connection as will be described later.

The switching power supply unit includes a power supply main section 10, voltage detection section 40 being connected in parallel with the power supply main section 10, a holding section 46 being connected to the voltage detection section 40, comparison section 47 being connected to the holding section 46, and control circuit 19 being connected to the power supply main section 10.

First, a configuration of the power supply main section 10 is described. The power supply main section 10 has a transformer 11 in a 3-winding type including a primary winding 11A and secondary windings 11B and 11C. A smoothing capacitor 12, an inverter circuit 13 and a resonance inductor 14 are provided in a primary side of the transformer 11, and a rectifier circuit 15 and a smoothing circuit 16 are provided in a secondary side thereof, respectively. The smoothing capacitor 12 and the inverter circuit 13 are provided between a primary high-voltage line L1H and a primary low-voltage line L1L, and the resonance inductor 14 is provided between the inverter circuit 13 and the primary winding 11A, respectively.

Moreover, the primary high-voltage line L1H has an input terminal T1, and a primary low-voltage line L1L has an input terminal T2 respectively, and the input terminals T1 and T2 are connected to output terminals of the high-voltage battery HB. Moreover, an output line LO being a line at a high-voltage side of the smoothing circuit 16 has an output terminal T3, and a ground line LG being a line at a low-voltage side of the smoothing circuit 16 has an output terminal T4 respectively, and the output terminals T3 and T4 are connected to input/output terminals of the low-voltage battery LB.

The inverter circuit 13 is a single-phase inverter circuit of converting a DC input voltage Vin outputted from the high-voltage battery HB into a single-phase AC voltage in approximately rectangular wave shape. The inverter circuit 13 is a full-bridge switching circuit formed by full bridge connection of four switching elements 13A, 13B, 13C and 13D each of which is driven according to a switching signal supplied from the control circuit 19. As the switching elements, elements such as MOS-FET (Metal Oxide Semiconductor-Field Effect Transistor) and IGBT (Insulated Gate Bipolar Transistor) are used.

The switching element 13A is provided between one end of the primary winding 11A of the transformer 11 and the primary high-voltage line L1H, and the switching element 13B is provided between the other end of the primary winding 11A and the primary low-voltage line L1L. The switching element 13C is provided between the other end of the primary winding 11A and the primary high-voltage line L1H, and the switching element 13D is provided between one end of the primary winding 11A and the primary low-voltage line L1L. The resonance inductor 14 is connected between a connection point between the switching elements 13A and 13D, and one end of the primary winding 11A.

Thus, in the inverter circuit 13, in response to on operation of the switching elements 13A and 13B, current flows along a first current path from the primary high-voltage line L1H to the primary low-voltage line L1L through the switching element 13A, primary winding 11A and switching element 13B in this order, and on the other hand, in response to on operation of the switching elements 13C and 13D, current flows along a second current path from the primary high-voltage line L1H to the primary low-voltage line L1L through the switching element 13C, primary winding 11A, resonance inductor 14 and switching element 13D in this order.

The transformer 11 is a magnetic element in which the primary winding 11A is magnetically coupled with the secondary windings 11B and 11C such that polarity of the primary winding 11A is the same as polarity of the secondary windings 11B and 11C. A pair of secondary windings 11B and 11C of the transformer 11 are connected to each other by a center tap C, and the center tap C is connected to the output terminal T4 via the ground line LG. That is, the switching power supply unit is a center-tap-type one. Thus, the transformer 11 transforms (steps down) an AC voltage converted by the inverter circuit 13, and outputs AC voltages VO1 and VO2, of which the phases are shifted by 180 degrees from each other, from respective ends A and B of the pair of secondary windings 11B and 11C. In this case, a level of voltage transformation is determined by a turn ratio between the primary winding 11A and the secondary windings 11B and 11C.

While the resonance inductor 14 may be configured by actually disposing a coil component, instead of this, or in conjunction with this, it may be configured by using series inductance including leakage inductance (not shown) of the transformer 11 and wirings.

The rectifier circuit 15 is in a single-phase full-wave rectification type including a pair of diodes 15A and 15B. An anode of the diode 15A is connected to one end A of the secondary winding 11B, and an anode of the diode 15B is connected to one end B of the secondary winding 11C, respectively. Cathodes of the diodes 15A and 15B are connected to each other at a connection point D, and connected to the output line LO. That is, the rectifier circuit 15 has a structure of cathode common connection, and separately rectifies the AC output voltages VO1 and VO2 of the transformer 11 in respective half-wave periods by the diodes 15A and 15B respectively, in order to obtain DC voltages.

The smoothing circuit 16 includes a choking coil 16A and a smoothing capacitor 16B. The choking coil 16A is inserted in the output line LO, and connected to the connection point D at one end, and connected to the output terminal T3 at the other end. The smoothing capacitor 16B is connected between the other end of the choking coil 16A and the ground line LG. According to such a configuration, the smoothing circuit 16 smoothes the DC voltage rectified by the rectifier circuit 15 to generate a DC output voltage Vout, and feeds the voltage Vout to the low-voltage battery LB from the output terminals T3 and T4.

Next, configurations of the voltage detection section 40 and other sections will be described. The voltage detection section 40 has a transformer 41 (voltage detection transformer), a diode 42 (first rectifier element), a diode 43 (second rectifier element), a switching element 44, a drive circuit 45, and a pair of detection signal lines W5 and W6.

The transformer 41 includes a primary winding 41A (first transformer coil), and a secondary winding 41B (second transformer coil) and a secondary winding 41C (third transformer coil), and is a 3-winding flyback transformer, in which the windings are magnetically coupled with one another such that polarity of the primary winding 41A and the secondary winding 41B is opposite to polarity of the secondary winding 41C.

The primary winding 41A and the secondary winding 41B have the same polarity, and the secondary winding 41C has polarity opposite to the polarity of the primary winding 41A and the secondary winding 41B.

The primary winding 41A is connected to an output terminal of the high-voltage battery HB via the diode 42, the secondary winding 41B is connected to the holding section 46 via the diode 43, and the secondary winding 41C is connected to an input/output terminal of the low-voltage battery LB. via the switching element 44.

More specifically, an end of the primary winding 41A is connected to an anode of the diode 42, and the other end of the primary winding 41A is connected to the input terminal T2, respectively. A cathode of diode 42 is connected to the input terminal T1. An end of the secondary winding 41B is connected to an anode of the diode 43, and the other end of the secondary winding 41B is connected to one end of the detection signal line W6. A cathode of diode 43 is connected to one end of the detection signal line W5. The other end of each of the detection signal line W5 and the detection signal line W6 is connected to the holding section 46. The detection signal line W6 is connected also to the output terminal T4. An end of the secondary winding 41C is connected to the output terminal T3, and the other end of the secondary winding 41C is connected to one end of the switching element 44, respectively. The other end of the switching element 44 is connected to the output terminal T4. The switching element 44 is connected also to a drive circuit 45 of supplying a switching signal for turning on or off the switching element 44. The drive circuit 45 is applied with power from the output terminals T3 and T4.

Thus, the transformer 41 is used in a so-called antiphase intermittent mode. The antiphase intermittent mode refers to an aspect that an input phase and an output phase are opposite to each other, and specifically refers to an aspect that even if the switching element 44 is turned on, and current is supplied from the output terminals T3 and T4 to the secondary winding 41C, current does not flow along a path of each of the primary winding 41A and the secondary winding 41B, and once the switching element 44 is turned off so that current supply is stopped, current flows along each of the paths. In the transformer 41, when the switching element 44 is turned on or off to flow current along a path of the primary winding 41A, a voltage containing information of a DC input voltage from the high-voltage battery HB is induced in the secondary winding 41B, which will be described in detail in description of operation.

For example, an element having a small withstanding voltage compared with the switching element 13A, 13B, 13C or 13D is used for the switching element 44, and for example, a diode having a small current capacity is used for the diode 42 or 43, respectively.

The holding circuit 46 is, for example, a circuit in which a capacitor 46C and a resistance 46R are connected in parallel between the detection signal lines W5 and W6. In a voltage V30 induced between the other end of the secondary winding 41B and the cathode of the diode 43, that is, the detection signal lines W5 and W6, the holding circuit 46 holds a peak voltage Vp1 for a predetermined time, and supplies the voltage Vp1 being held to the comparison section 47.

The comparison section 47 includes, for example, a comparator, and determines a level relation between an absolute value of the voltage Vp1 inputted from the holding section 46 and an absolute value of a reference voltage Vref, and when the absolute value of the voltage Vp1 inputted from the holding section 46 is larger, outputs a control signal S1 for stopping a switching signal to be outputted from the control circuit 19.

Next, operation of the switching power supply unit having a configuration as above will be described. Hereinafter, operation of the power supply body unit 10, operation principle of the voltage detection section 40 as one of featured portions of the embodiment, and operation of a peripheral circuit of the voltage detection section 40 will be sequentially described.

First, operation of the power supply unit body 10 will be described.

When the switching elements 13A and 13B of the inverter circuit 13 are turned on, current flows in a direction from the switching element 13A to the switching element 13B, and voltages VO1 and VO2 induced in the secondary windings 11B and 11C of the transformer 11 becomes in a reverse direction with respect to the diode 15B, and in a forward direction with respect to the diode 15A. Therefore, current flows from the secondary winding 11B to the output line LO through the diode 15A.

Next, when the switching element 13B is turned off, and the switching element 13C is turned on, a voltage −VO2 induced in the secondary winding 11C of the transformer 11 becomes in a forward direction with respect to the diode 15B. Therefore, current flows from the secondary winding 11C to the output line LO through the diode 15B.

When the switching elements 13C and 13D are turned on, current flows in a direction from the switching element 13C to the switching element 13D, and voltages −VO1 and −VO2 induced in the secondary windings 11B and 11C of the transformer 11 becomes in a forward direction with respect to the diode 15B, and in a reverse direction with respect to the diode 15A. Therefore, current flows from the secondary winding 11C to the output line LO through the diode 15B.

Next, when the switching element 13C is turned off, and the switching element 13B is turned on, a voltage −VO1 induced in the secondary winding 11B of the transformer 11 becomes in a forward direction with respect to the diode 15A. Therefore, current flows from the secondary winding 11B to the output line LO through the diode 15A.

In this way, the power supply body unit 10 transforms (steps down) the DC input voltage Vin supplied from the high-voltage battery HB into the DC output voltage Vout, and feeds the transformed DC output voltage Vout to the low-voltage battery LB.

Next, operation principle of the voltage detection circuit 40 and operation of a peripheral circuit of the voltage detection circuit 40 are described with reference to FIGS. 16 to 20.

Figure 16:
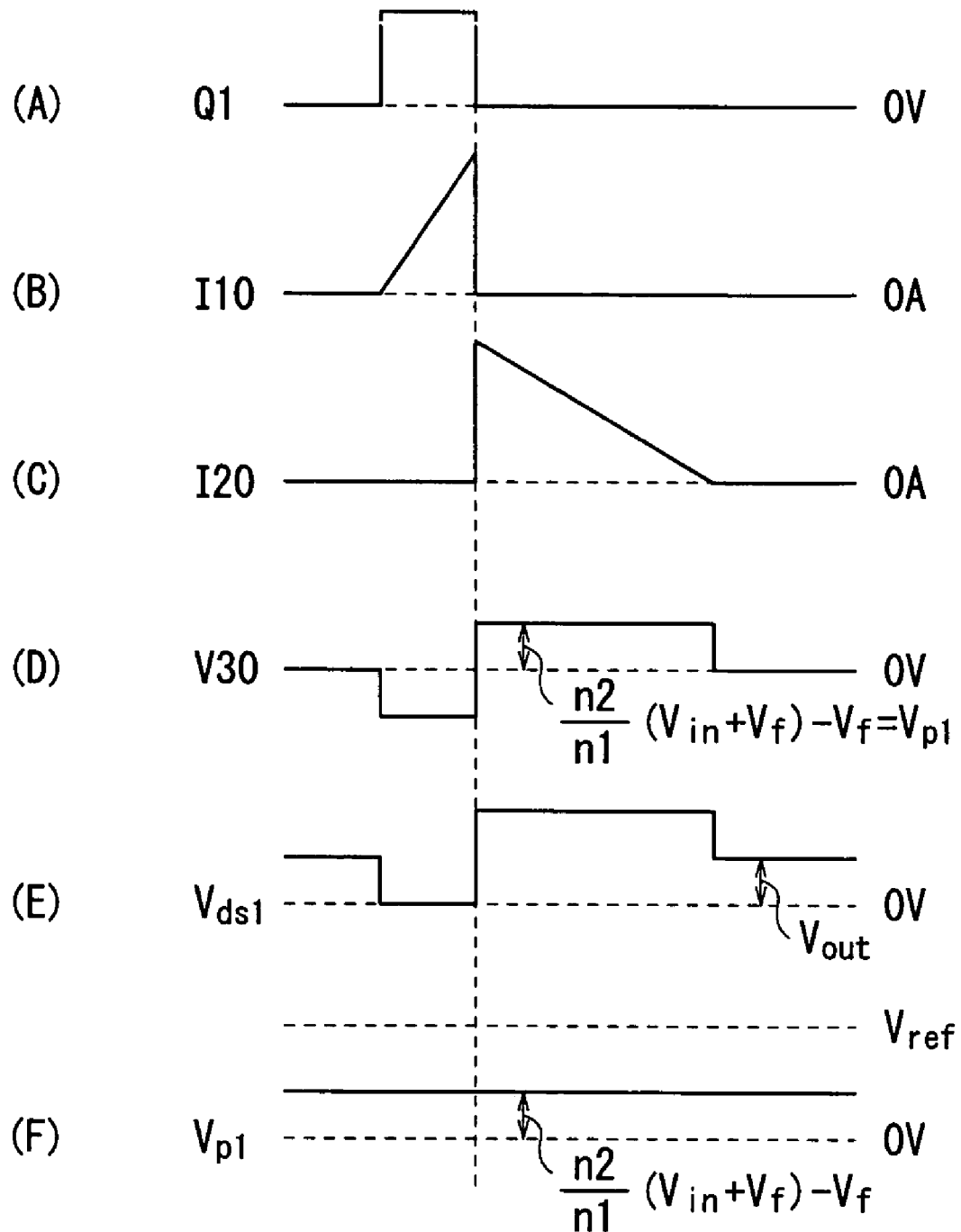
FIG. 16 shows timing waveform charts for explaining an operation principle of a voltage detection section in FIG. 15.
Figure 17:
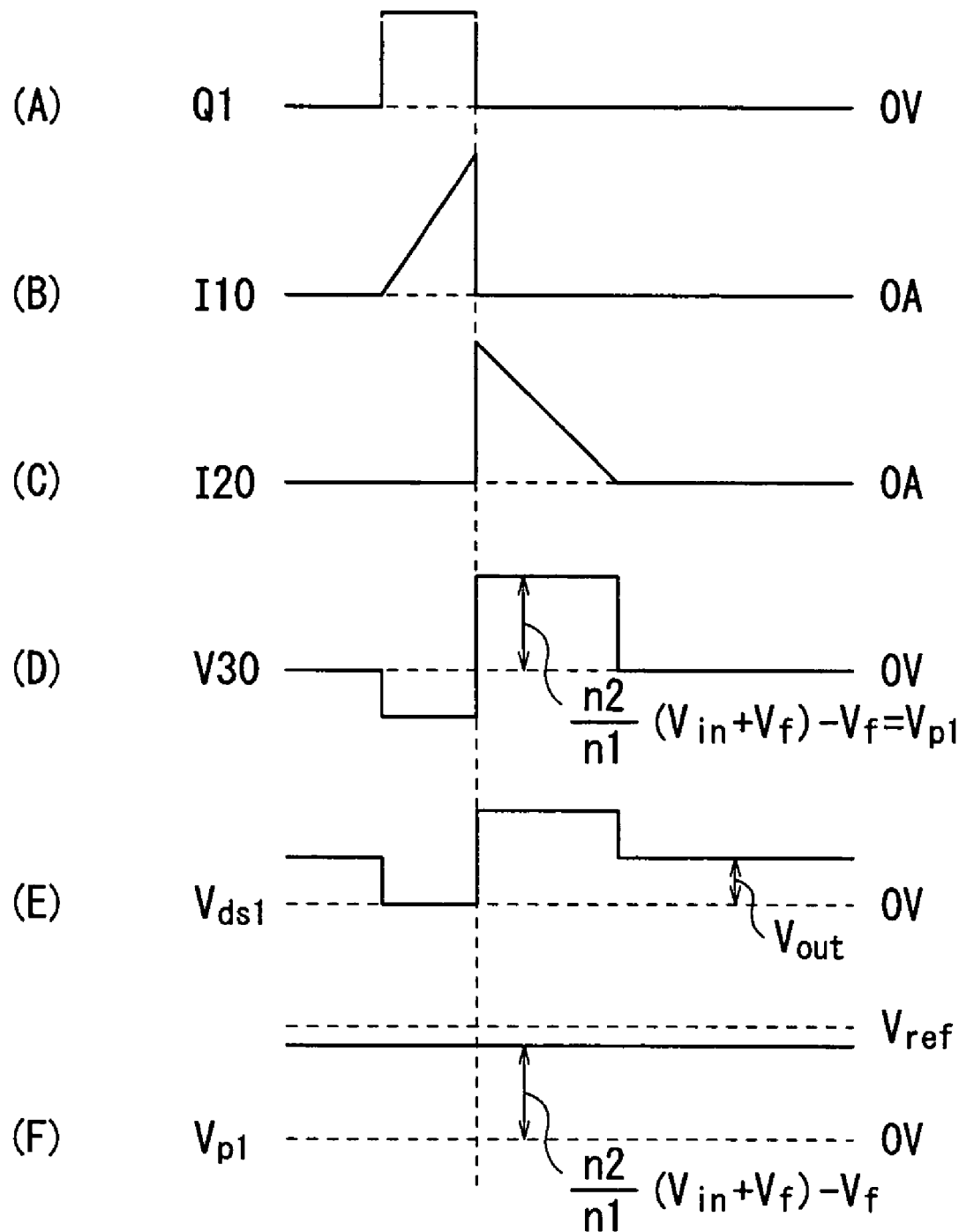
FIG. 17 shows another timing waveform charts for explaining the operation principle of the voltage detection section in FIG. 15.
Figure 18:
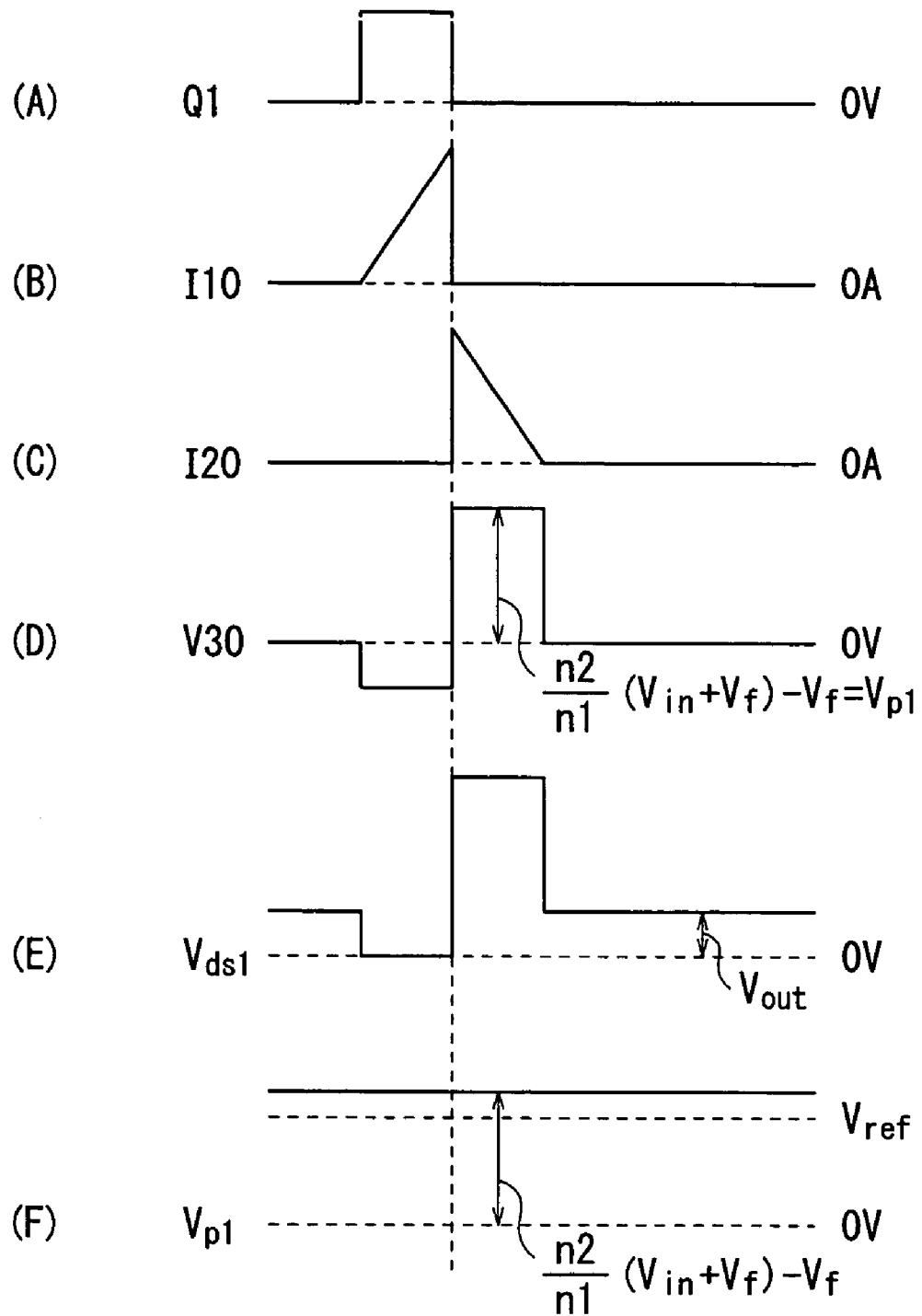
FIG. 18 shows further another timing waveform charts for explaining the operation principle of the voltage detection section in FIG. 15.
Figure 19:
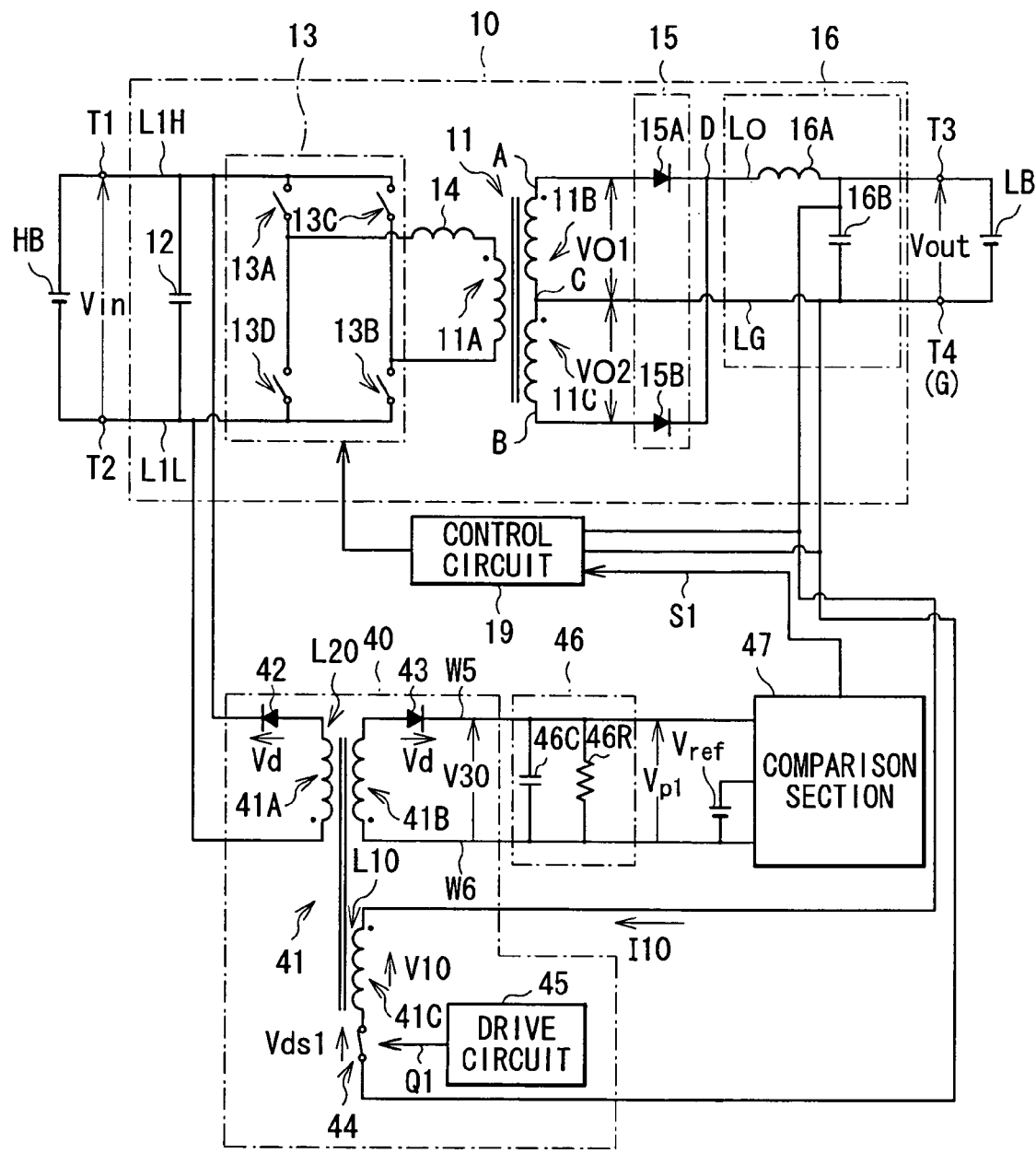
FIG. 19 shows a circuit diagram for explaining the operation principle of the voltage detection section in FIG. 15.

Here, FIG. 16 show an example of respective waveform charts when the DC input voltage Vin is in a lower site within a range where an internal circuit is not broken (hereinafter, referred to as "within a secure range"), FIG. 17 shows an example of respective waveform charts when the DC input voltage Vin is in an upper site within the secure range, and FIG. 18 shows an example of respective waveform charts when the DC input voltage Vin is large compared with an absolute value of the reference voltage Vref being an upper limit of the secure range, respectively. FIG. 19 is for explaining operation while the switching element 44 is on, and FIG. 20 is for explaining operation while the switching element 44 is off, respectively.

(A) in FIGS. 16, 17 and 18 show a switching signal Q1 outputted from the drive circuit 45; (B) in FIGS. 16, 17 and 18 show a current I10 flowing through the secondary winding 41C; (C) in FIGS. 16, 17C and 18 show a current I20 flowing through the primary winding 41A; (D) in FIGS. 16, 17 and 18 show a voltage V30 induced in the secondary winding 41B; (E) in FIGS. 16, 17 and 18 show a voltage Vds1 of the switching element 44; and (F) in FIGS. 16, 17 and 18 show an output voltage (voltage Vp1 between detection signal lines W5 and W6) of the voltage detection section 40, respectively.

When a pulse-like switching signal Q1 is outputted from the drive circuit 45, and the switching element 44 is turned on as shown in (A) in FIGS. 16, 17, 18 and FIG. 19, the current I10 supplied from the output terminals T3 and T4 flows through the secondary winding 41C while increasing with a slope V10/L10 as shown in (B) in FIGS. 16, 17 and 18. Here, V10 is a voltage (=Vout) of the secondary winding 41C, and L10 is inductance of the secondary winding 41C. At that time, since a reverse bias voltage Vd is induced in the diodes 42 and 43, current does not flow along the paths of the secondary windings 41B and 41C. Thus, while the switching element 44 is on, energy is stored in the transformer 41. The switching element 44 is not necessarily turned on or off in synchronization with the switching element 13A, 13B, 13C or 13D of the power supply main section 10.

Figure 20:
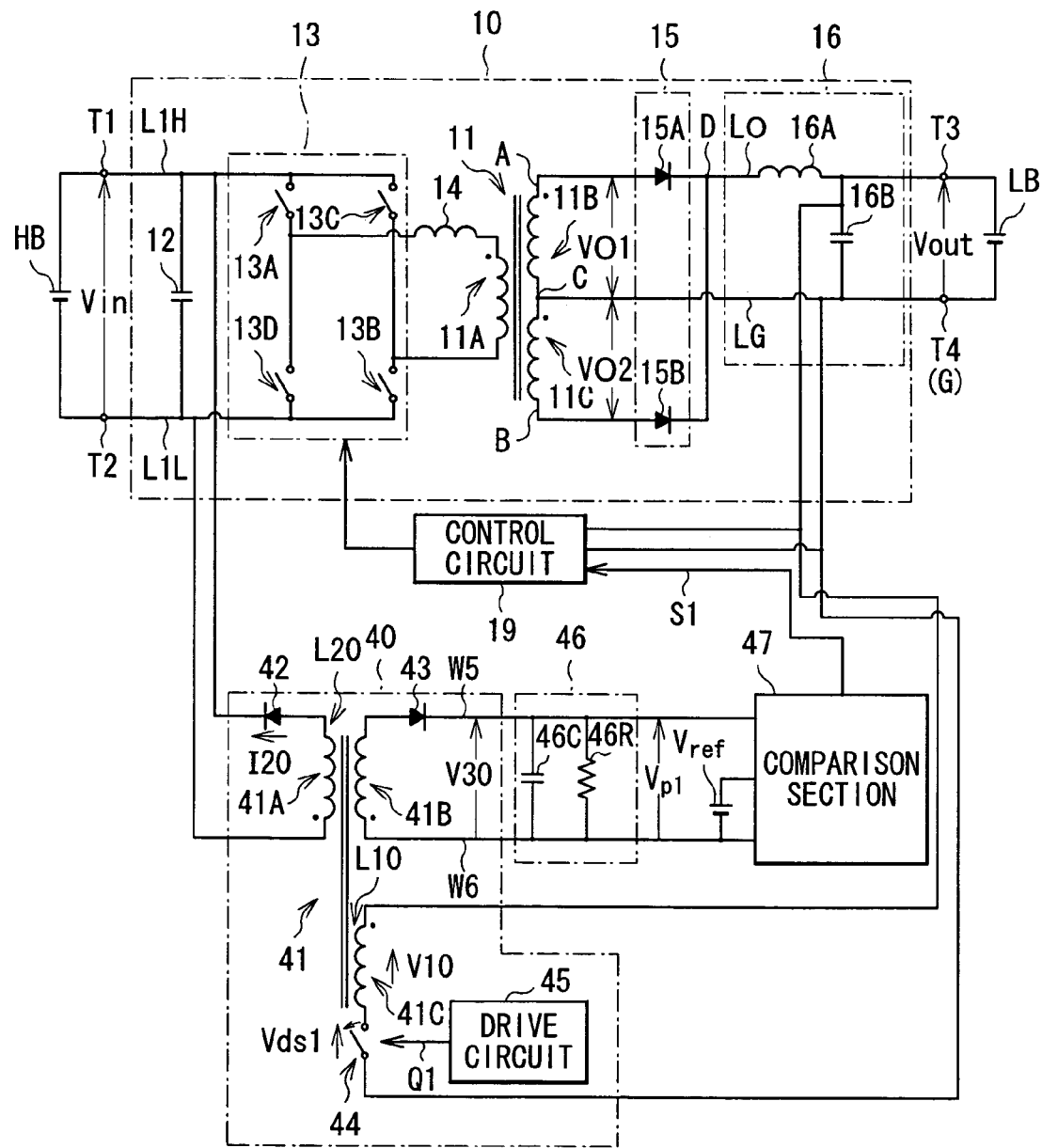
FIG. 20 shows another circuit diagram for explaining the operation principle of the voltage detection section in FIG. 15.

Then, as shown in FIG. 20, when the switching element 44 is turned off, the stored energy is released to the primary winding 41A, and a current I20 flows through the primary winding 41A while decreasing with a slope −(Vin+Vf)/L20 as shown in (C) in FIGS. 16, 17 and 18. Here, Vf is forward voltage of a diode and L20 is inductance of the primary winding 41A. The current I2 contains information of the DC input voltage Vin, but does not include the DC output voltage Vout while flowing along the path of the primary winding 41A.

When the current I20 flows through the primary winding 41A, the voltage V30 is induced between the cathode of the diode 43 and the other end of the secondary winding 41B as shown in (D) in FIGS. 16, 17 and 18. Here, assuming that a forward direction of the diode 43 is positive, the voltage V30 corresponds to $(n2/n1) \times (Vin+Vf)-Vf$ (=peak voltage Vp1) while the current I20 flows, and falls to zero when flow of the current I20 is stopped. Here, n1 is the number of turns of the primary winding 41A, and n2 is the number of turns of the secondary winding 41B. The voltage V30 contains the information of the DC input voltage Vin, but does not include the DC output voltage Vout, as the current I20. At that time, while current does not flow through the secondary winding 41C, a voltage Vds1 $(=(n3/n2) \times V3+Vout)$, of which the value is corresponding to a value of the voltage 30 added with the DC output voltage Vout, is induced in the switching element 44 as shown in (E) in FIGS. 16, 17 and 18. In this way, Vds1 includes information of the DC output voltage Vout. Here, n3 is the number of turns of the secondary winding 41C.

When the peak voltage Vp1 is induced in the secondary winding 41B, the holding section 46 holds the voltage for a predetermined time, and outputs it into the comparison section 47, as shown in (F) in FIGS. 16, 17 and 18.

When the peak voltage Vp1 is inputted from the holding section 46, the comparison section 47 determines a level relation between the peak voltage Vp1 and the reference voltage Vref. Here, the reference voltage Vref is assumed to be a value $(n2/n1) \times (Vmax+Vf)-Vf$, which is corresponding to a value obtained in a way that an upper limit value Vmax within the secure range is added with the forward voltage Vf, then a resultant value is divided by 'n1/n2', and then a resultant value is subtracted with the forward voltage Vf.

Here, when a peak voltage Vp1 having a level as shown in (F) in FIG. 16 or FIG. 17 is inputted, the comparison section 47 determines that the DC input voltage Vin is within the secure range, and for example, does not output any signal. On the other hand, when a peak voltage Vp1 having a level as shown in (F) in FIG. 18 is inputted, the comparison section 47 determines that the DC input voltage Vin is more than the secure range, and for example, outputs the control signal S1 for stopping the switching signal outputted from the control circuit 19. For example, when the control circuit 19 receives the control signal S1, it stops outputting the switching signal. In this way, the internal circuit is protected from an excessively large DC input voltage Vin.

After output of the switching signal has been stopped, when the peak voltage Vp1 having the level as shown in (F) in FIG. 16 or FIG. 17 is inputted, the comparison section 47 determines that the DC input voltage Vin is returned to be within the secure range, and for example, stops outputting the switching signal S1. As a result, a switching signal is outputted from the control circuit 19.

Figure 21:
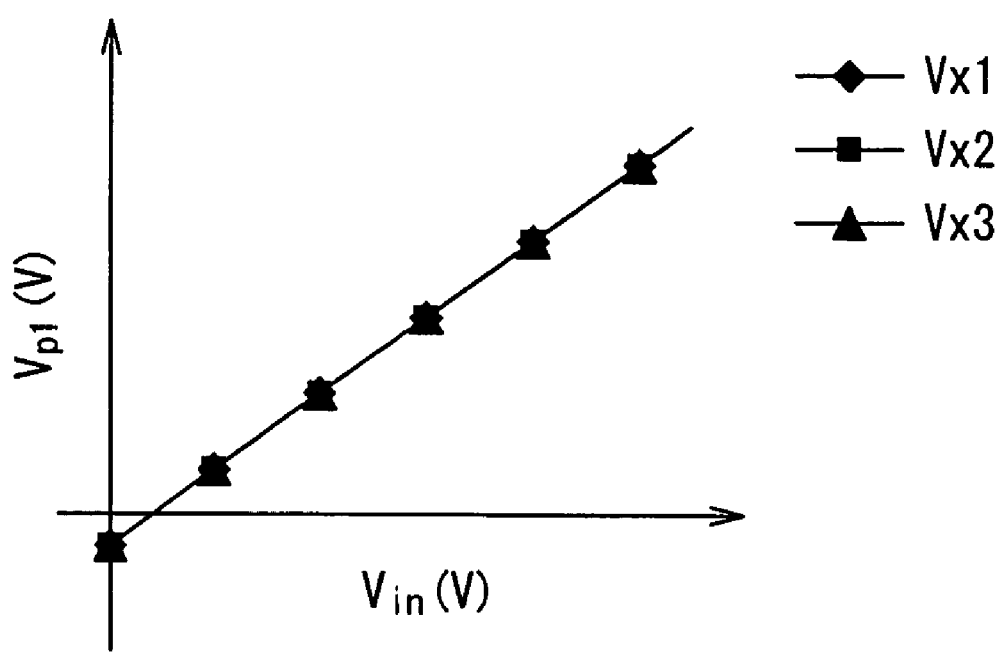
FIG. 21 shows a characteristic view for explaining measurement accuracy of the voltage detection section in FIG. 15.

Next, measurement accuracy and the like of the voltage detection circuit 40 will be described. FIG. 21 shows an example of a relationship between the DC input voltage Vin and the peak voltage Vp1 induced in the secondary wiring 41B by graphs. In the graphs, a slope corresponds to n2/n1, and an intercept corresponds to (n2/n1)×Vf−Vf, respectively. The figure shows graphs when the DC output voltages Vout have 3 kinds of voltage values, V×1, V×2 and V×3, the value being different from one another.

It can be confirmed from the figure that even if a value of the DC output voltages Vout is varied, a value of the peak voltage Vp1 induced in the secondary wiring 41B is not varied. This is because the primary winding 41A, secondary wiring 41B, and secondary wiring 41C are magnetically coupled with one another such that polarity of the primary winding 41A and secondary wiring 41B is opposite to polarity of the secondary wiring 41C, and the diodes 42 and 43 are disposed such that forward directions of the diodes 42 and 43 are equal to a direction of current flowing through the primary winding 41A and the secondary winding 41B after the switching element 44 is changed from on to off, so that a phase of current flowing along a path of the primary winding 41A and the secondary winding 41B is opposite to a phase of current flowing along a path of the secondary winding 41C. As a result, the peak voltage Vp1 does not contain the information of the DC output voltage Vout. Therefore, the DC output voltage Vout need not be stabilized by purposely providing a regulator unlike the Japanese Unexamined Patent Publication No. 2003-33015.

Moreover, since all the graphs are approximately perfectly linear, the DC input voltage Vin can be accurately detected only by simply inputting the peak voltage Vp1 into a comparator. Therefore, the peak voltage Vp1 need not be purposely corrected using an arithmetic circuit unlike the Japanese Unexamined Patent Publication No. 2003-33015. To detect the DC input voltage Vin more accurately, a value of a detected DC input voltage Vin is preferably not varied depending on change in temperature of external environment, and for example, values of n1 and n2 are preferably set such that the peak voltage Vp1 is large in such a level that fluctuation of the forward voltage Vf can be negligible.

Since the voltage detection circuit 40 directly detects a signal from the input terminals T1 and T2 being connected to the output ends of the high-voltage battery HB, even if operation of the power supply main section 10 is stopped, the peak voltage Vp1 can be detected.

As hereinbefore, in the embodiment, the primary winding 41A in the voltage detection section 40 is connected to the input terminals T1 and T2 being connected to the output ends of the high-voltage battery HB, thereby the voltage containing the information of the DC input voltage Vin is directly detected from the output ends of the high-voltage battery HB, therefore even if the DC output voltage Vout is varied, a value of the DC input voltage Vin can be accurately detected. Moreover, even if switching operation of the power supply main section 10 is stopped, since the voltage detection section 40 can detect the voltage containing the information of the DC input voltage Vin, a value of the DC input voltage Vin can be detected at any time.

Moreover, since the voltage detection section 40 has an approximately perfectly linear input/output characteristic, an arithmetic circuit need not be purposely used, thereby detection speed of the DC input voltage Vin can be increased. Moreover, even if the DC output voltage Vout is varied, since influence on a detected value of the DC input voltage Vin is avoided, a regulator need not be provided.

Moreover, since the winding (secondary winding 41C) connected with the switching element 44 is provided in the secondary side being the low-voltage side, thereby the switching element 44 having low withstanding voltage can be used the voltage detection section 40 can be inexpensively manufactured.

While the secondary winding 41C is connected to the low-voltage battery LB being connected to the output terminals T3 and T4 in the embodiment, a low-voltage battery LB being separate from the low-voltage battery LB may be provided to be connected to the secondary winding 41C.

In the embodiment, the voltage induced in the secondary winding 41B is designed to be inputted into the comparison section 47 via the holding section 46, so that a value of the voltage inputted from the secondary winding 41B into the comparison section 47 is equal to a value of the peak voltage Vp1 at any time; however, the voltage induced in the secondary winding 41B may be designed to be directly inputted into the comparison section 47 rather than via the holding section 46. However, in this case, since the voltage inputted into the comparison section 47 has the same value as that of the peak voltage Vp1 only for a period while the current flows through the primary winding 41A, for example, it is necessary to provide a sampling mechanism in the control circuit 19, which can determine only a signal inputted from the comparison section 47 into the control circuit 19 in the period as an effective signal.

Figure 22:
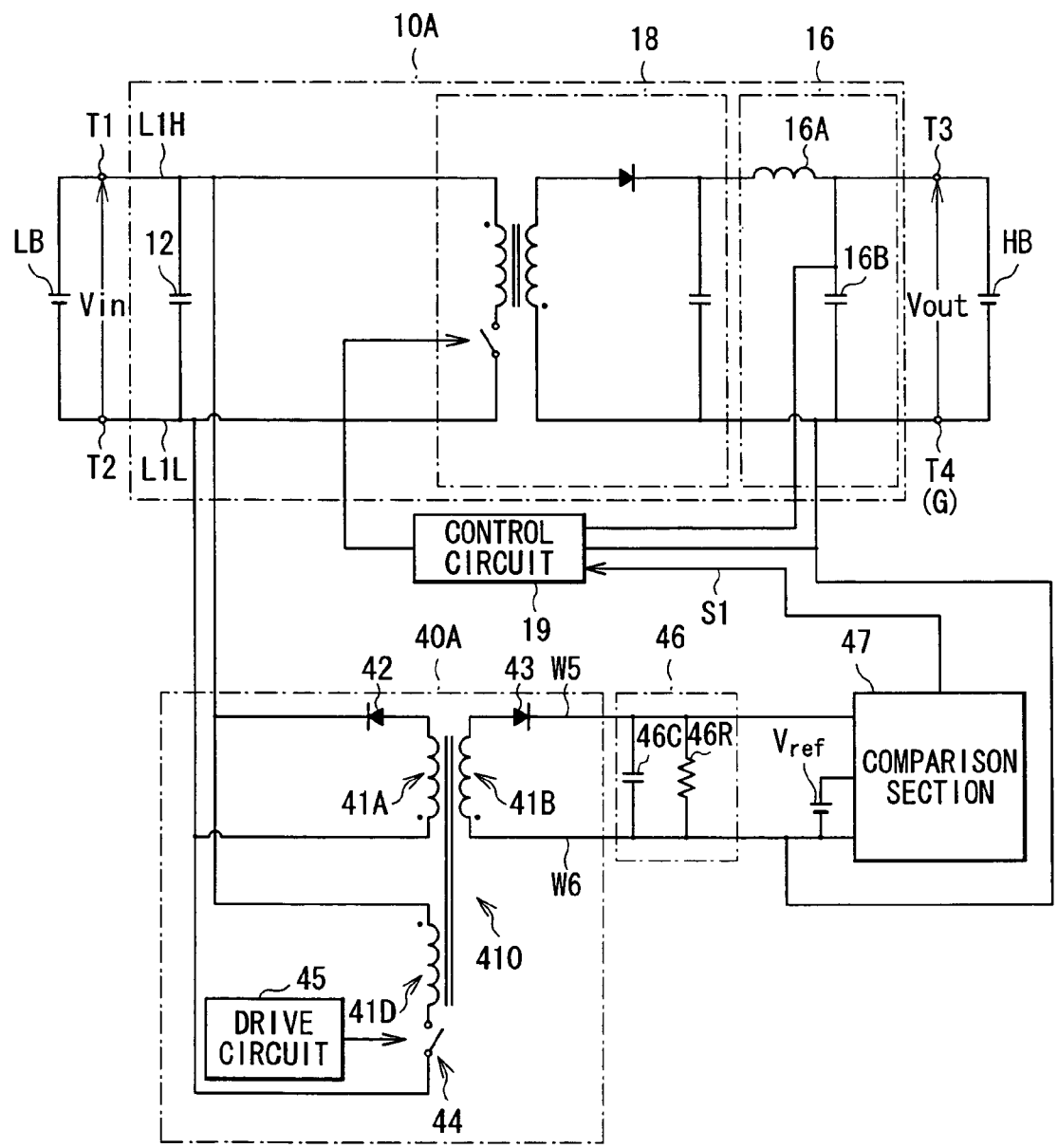
FIG. 22 shows a circuit diagram showing a configuration of a switching power supply unit according to a modification of the third embodiment.

Moreover, while a circuit configuration of the switching power supply unit is described with a specific configuration in the embodiment, the circuit configuration is not limited to this. For example, the inverter circuit may be configured in a full bridge type using 4 switching elements, forward type using 1 or 2 switching elements, or half-bridge type using 2 switching elements. Moreover, for example, as a power supply main section 10A as shown in FIG. 22, the inverter circuit and the transformer may be configured by a step-up flyback converter 18.

When the power supply body unit is in a step-down type as the power supply body unit 10 shown in FIG. 15, the switching element 44 and the winding (winding 41C) connected with the switching element 44 in the voltage detection section 40 are preferably provided in the secondary side of the transformer 41. On the other hand, when the power supply body unit is in a step-up type as the power supply body unit 10A shown in FIG. 22, the switching element 44 and a winding (winding 41D) connected with the switching element 44 in a voltage detection section 40A are preferably provided in the primary side of a transformer 41O. In this way, the switching element 44 and the winding connected with the switching element 44 are provided in the low-voltage side, thereby a switching element having low withstanding voltage can be used, and the voltage detection section can be inexpensively manufactured, as the embodiment.

It should be understood by those skilled in the art that various modifications, combinations, sub-combinations and alternations may occur depending on design requirements and other factors insofar as they are within the scope of the appended claims or the equivalents thereof.

What is claimed is:

1. A switching power supply unit, comprising:
a power supply main section switching a DC input voltage inputted from a first power supply to convert the DC input voltage into an AC voltage, and outputting a DC output voltage into a second power supply, the DC output voltage being obtained by transforming and rectifying the AC voltage; and
a voltage detection section having a voltage detection transformer, one or more switching elements, and detection signal lines,
wherein the voltage detection transformer includes
a first transformer coil as a primary winding being intermittently applied with the DC input voltage in response to on/off of the switching element, and
a second transformer coil as a secondary winding being connected to the detection signal lines, and
wherein the voltage detection section has two switching elements each disposed in each of both ends of the first transformer coil and a regeneration circuit which regenerates energy stored in the voltage detection transformer for the first power supply, and
the first transformer coil and the two switching elements are connected in series with each other between a couple of output terminals of the first power supply.

2. The switching power supply unit according to claim 1, further comprising:
a holding section holding output voltage on the detection signal lines when the switching element is on; and
a comparison section outputting a control signal for stopping switching operation of the power supply main section when an absolute value of the voltage held by the holding section is larger than an absolute value of a reference voltage.

3. The switching power supply unit according to claim 1, wherein the first transformer coil is magnetically coupled with the second transformer coil such that polarity of the first transformer coil is the same as polarity of the second transformer coil.

4. The switching power supply unit according to claim 1, wherein the switching element is driven by using power supplied from the second power supply.

5. A voltage detection circuit detecting a DC voltage, comprising:
a voltage detection section;
a voltage detection transformer;
one or more switching elements; and
detection signal lines,
wherein the voltage detection transformer includes
a first transformer coil as a primary winding being intermittently applied with the DC voltage in response to on/off of the switching element, and
a second transformer coil as a secondary winding being connected to the detection signal lines,
wherein the voltage detection section has two switching elements each disposed in each of both ends of the first transformer coil and a regeneration circuit which regenerates energy stored in the voltage detection transformer for a first power supply, and
the first transformer coil and the two switching elements are connected in series with each other between a couple of output terminals of the first power supply.

6. A switching power supply unit, comprising:
a power supply main section switching a DC input voltage inputted from a first power supply to convert the DC input voltage into an AC voltage, and outputting a DC output voltage into a second power supply, the DC output voltage being obtained by transforming and rectifying the AC voltage;
a voltage detection section having a voltage detection transformer, a switching element, and detection signal lines;
wherein the voltage detection transformer includes
a first transformer coil as a primary winding being connected to the first power supply,
a second transformer coil as a secondary winding being connected to the detection signal lines, and
a third transformer coil magnetically coupled with the first transformer coil as a primary winding and intermittently applied with a DC voltage in response to on/off of the switching element, and
wherein the first transformer coil, second transformer coil, and third transformer coil are magnetically coupled with one another such that polarity of the first and second transformer coils is opposite to polarity of the third transformer coil, and
the voltage detection section has
a first rectifier element disposed to allow current to flow through the first transformer coil only when the switching element is off, and
a second rectifier element disposed to allow current to flow through the second transformer coil only when the switching element is off.

7. The switching power supply unit according to claim 6 further comprising:
a holding section holding output voltage on the detection signal lines after the switching element has been changed from on to off; and
a comparison section outputting a control signal for stopping switching operation of the switching circuit when an absolute value of the voltage held by the holding section is larger than an absolute value of a reference voltage.

8. The switching power supply unit according to claim 6, wherein the power supply main section is configured to allow the DC output voltage to be lower than the DC input voltage, and
the third transformer coil is supplied with energy from the second power supply.

9. The switching power supply unit according to claim 6, wherein the power supply main section is configured to allow the DC output voltage to be higher than the DC input voltage, and
the third transformer coil is supplied with energy from the first power supply.

10. A voltage detection circuit detecting a DC voltage, comprising:
a voltage detection section;
a voltage detection transformer;
a switching element; and
detection signal lines,
wherein the voltage detection transformer includes
a first transformer coil as a primary winding being connected to a supply side of the DC voltage,
a second transformer coil as a secondary winding being connected to the detection signal lines, and a third transformer coil magnetically coupled with the first transformer coil as a primary winding, and intermittently applied with a DC voltage in response to on/off of the switching element, and wherein the first transformer coil, second transformer coil, and third transformer coil are magnetically coupled with one another such that polarity of the first and second transformer coils is opposite to polarity of the third transformer coil, and the voltage detection section has a first rectifier element disposed to allow current to flow through the first transformer coil only when the switching element is off, and a second rectifier element disposed to allow current to flow through the second transformer coil only when the switching element is off.

* * * * *